(12) United States Patent
Froebel et al.

(10) Patent No.: US 9,960,560 B2
(45) Date of Patent: May 1, 2018

(54) CONTACT-COMMUTATED ELECTRIC MOTOR

(71) Applicant: Mahle International GmbH, Stuttgart (DE)

(72) Inventors: Marcel Froebel, Zaberfeld (DE); Martin Helmis, Esslingen (DE); Bernd Mack, Remshalden (DE); Peter Wieske, Korntal-Muenchingen (DE)

(73) Assignee: Mahle International GmbH (DE)

( * ) Notice: Subject to any disclaimer, the term of this patent is extended or adjusted under 35 U.S.C. 154(b) by 536 days.

(21) Appl. No.: 14/423,646

(22) PCT Filed: Aug. 14, 2013

(86) PCT No.: PCT/EP2013/067015
§ 371 (c)(1),
(2) Date: Feb. 24, 2015

(87) PCT Pub. No.: WO2014/032978
PCT Pub. Date: Mar. 6, 2014

(65) Prior Publication Data
US 2016/0190756 A1    Jun. 30, 2016

(30) Foreign Application Priority Data

Aug. 31, 2012   (DE) .................. 10 2012 215 522

(51) Int. Cl.
*H02K 13/00*   (2006.01)
*H01R 39/18*   (2006.01)
*H02K 23/62*   (2006.01)

(52) U.S. Cl.
CPC ............. *H01R 39/18* (2013.01); *H02K 23/62* (2013.01); *H02K 13/003* (2013.01); *H02K 13/006* (2013.01)

(58) Field of Classification Search
CPC ........ H01R 39/20; H01R 39/22; H01R 39/24; H01R 39/26; H01R 39/28; H01R 39/30; H01R 23/62
USPC ....................................................... 310/232
See application file for complete search history.

(56) References Cited

U.S. PATENT DOCUMENTS

| 4,949,023 A | 8/1990 | Shlien |
| 2001/0005105 A1 | 6/2001 | Choe |

FOREIGN PATENT DOCUMENTS

| CN | 1303165 A | 7/2001 |
| CN | 1318219 A | 10/2001 |
| EP | 1113569 A1 | 7/2001 |
| FR | 2801737 A1 | 6/2001 |
| WO | WO-2012/049781 A1 | 4/2012 |

OTHER PUBLICATIONS

English abstract provided for FR-2801737.
Chinese Office Action dated Mar. 1, 2017 related to corresponding Chinese Patent Application No. 201380042587.6.

*Primary Examiner* — Terrance Kenerly
(74) *Attorney, Agent, or Firm* — Fishman Stewart PLLC

(57) ABSTRACT

An electric motor with contact commutation may include an external stator and an internal, rotatably mounted rotor. A magnet arrangement including at least one permanent magnet may be arranged fixedly on the rotor. A coil arrangement including at least one electric coil may be arranged fixedly on the stator. A contact commutation assembly may be in communication with the coil arrangement.

30 Claims, 21 Drawing Sheets

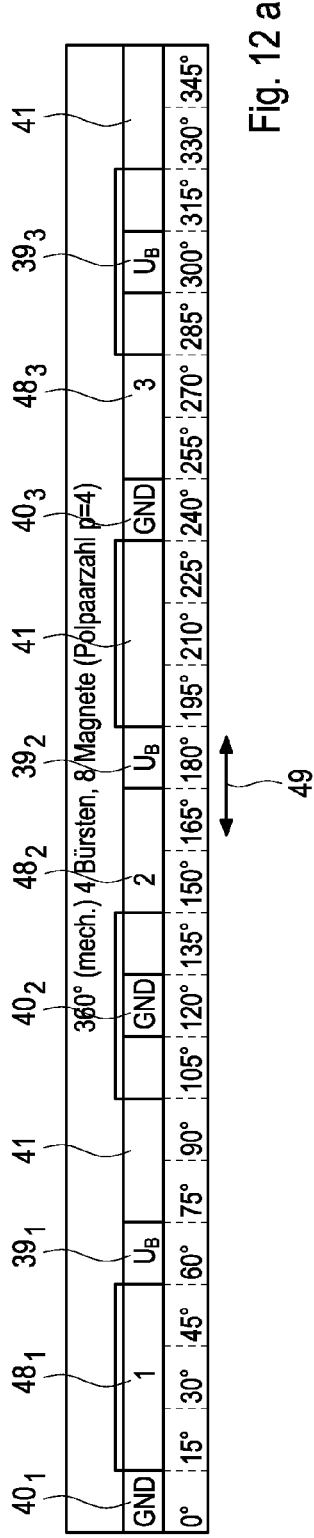
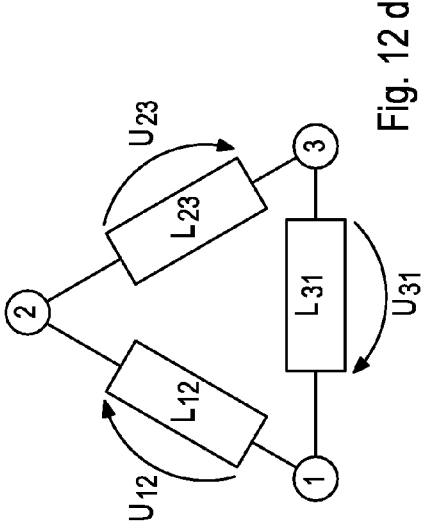
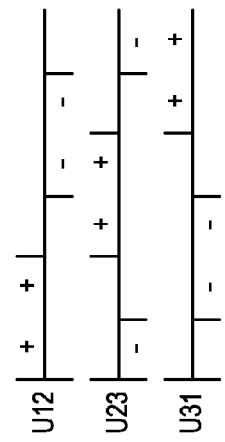
Fig. 12 a
Fig. 12 b
Fig. 12 c
Fig. 12 d

CONTACT-COMMUTATED ELECTRIC MOTOR

CROSS-REFERENCE TO RELATED APPLICATIONS

This application claims priority to German Patent Application No. 10 2012 215 522.8, filed Aug. 31, 2012, and International Patent Application No. PCT/EP2013/067015, filed Aug. 14, 2013, both of which are hereby incorporated by reference in their entirety.

TECHNICAL FIELD

The present invention relates to an electric motor with contact commutation. The present invention also relates to a vehicle component which is equipped with an adjustable actuator and with an electric motor of the above-described type.

BACKGROUND

Electric motors are generally known and comprise a stator and a rotor, which can be rotated relatively to the stator, the rotor driving or forming a drive shaft of the electric motor, by means of which the drive power at the electric motor can be tapped. Electric motors are divided into direct-current electric motors, DC motors for short, and alternating-current electric motors, AC motors for short. Furthermore, internal rotors, with which the rotor is arranged concentrically in the stator, and external rotors, with which the stator is arranged concentrically in the rotor, are differentiated from one another. Finally, contactlessly commutated electric motors are differentiated from contact-commutated electric motors. Contact commutation takes place via a physical or mechanical contact by means of at least one contact element, which to this end bears directly on a sliding contour and creates an electrical connection. The contact element can also be termed a "brush". Generally, a contact element of this type has a contact body made from carbon. In contrast, a contactless commutation takes place electronically, that is to say by means of corresponding electronics or an electrical circuit.

Electric motors are used in virtually all areas of technology. In particular, electric motors are also used for vehicles, in order to adjust movable actuators. By way of example and without limiting the generality, mention may be made here of a throttling device with a throttle as actuator, which can be adjusted with the aid of an electric motor, in order to set the throttling of the fresh-air flow in a ventilation system of an internal combustion engine. Furthermore, flap devices are conceivable, in which at least one flap can be adjusted with the aid of an electric motor, for example in order to influence the feeding of fresh air into a combustion chamber of the internal combustion engine. Furthermore, electric motors can be used in a turbine of a charging apparatus, preferably in an exhaust turbocharger, for example in order to actuate a wastegate valve or to actuate a variable turbine geometry.

In automotive uses in particular, the respective electric motor can be exposed to a comparatively large thermal load, as a result of which the durability or the expected service life of the respective electric motor is reduced.

An increased thermal load is produced in particular also in uses, in which the electric motor must hold an actuator counter to a restoring force, so that in the respective coil arrangement, the entire electrical power is converted into heat, which cannot or can only be poorly dissipated in a warm or hot environment.

SUMMARY

The present invention is concerned with the problem of specifying an improved embodiment for an electric motor of this type or for a vehicle component equipped therewith, which in particular has an increased service life of the electric motor.

According to the invention, this problem is solved by the subject matter of the independent claim. Advantageous embodiments form the subject matter of the dependent claims.

The invention is based on the general concept of equipping the electric motor as internal rotor with contact commutation, in which a coil arrangement is arranged exclusively on the stator, whilst a magnet arrangement is provided on the rotor. By using contact commutation, it is possible to dispense with electronics, which are required in the case of contactless commutation. As the coil arrangement is accommodated on the stator, the respective coil is located radially externally in the case of an internal rotor, that is to say on the one hand on a comparatively large cross section and on the other hand on or in a housing of the electric motor, as a result of which heat of the coil arrangement can be dissipated comparatively easily. The thermal loading of the electric motor is significantly reduced by means of the suggested structure, which considerably lengthens the service life of the electric motor and any vehicle component equipped therewith.

Owing to the structure according to the invention, the electric motor can advantageously also be used in thermally loaded applications, such as in vehicle components that are arranged close to the engine. Accordingly, a vehicle component equipped therewith, for example a throttle device or a flap device or a turbine or an exhaust turbocharger with variable turbine geometry or with a wastegate valve, has an increased service life.

The electric motor according to the invention is preferably configured as a direct-current motor. However, an embodiment as alternating-current motor is also possible in principle.

The magnet arrangement comprises at least one permanent magnet, which is arranged fixedly on the rotor. The coil arrangement comprises at least one electric coil, which is fixedly arranged on the stator. According to the invention, all the coils of the coil arrangement are arranged on the stator so that no coil is arranged on the rotor. Preferably, all the permanent magnets of the magnet arrangement are arranged on the rotor exclusively.

The contact element can also be termed a "brush". Generally, a contact element of this type has a contact body made from carbon.

According to an advantageous embodiment, the contact commutation can have a contact element arrangement, which is driven rotatably by the rotor and has at least one contact element, and a slip ring arrangement, which is arranged in a rotationally fixed manner relative to the stator, particularly arranged fixedly on a housing containing the stator in a rotationally fixed manner and has at least one slip ring. A geometrically simple, robust and reliable mechanical commutation results thereby.

According to an advantageous development, a plurality of slip rings can be provided, at least two such slip rings forming a slip ring group inside the slip ring arrangement and being electrically connected to one another via at least one such contact element of the contact element arrangement. The contact element arrangement or the respective contact element is expediently electrically insulated with respect to the rotor. Furthermore, the slip ring arrangement or the respective slip rings are electrically insulated with respect to the housing. Owing to the inner contact element arrangement arranged on the rotor side, only the commutation of the slip ring arrangement arranged on the stator side takes place on the rotor side, as a result of which an electrification of the slip rings can take place via the stationary housing and as a result is facilitated considerably.

According to another advantageous development, it can be provided that the respective slip ring group only comprises two slip rings, which define a slip ring pair. The respective slip ring pair can then comprise a first slip ring and a second slip ring. The first slip ring can be electrically connected to the coil arrangement or to the associated coil strand. By contrast, the second slip ring can be segmented in the circumferential direction and comprise at least one plus-pole segment, at least one minus-pole segment and at least two insulator segments. The respective plus-pole segment is in this case electrically connected to a plus-pole terminal of the electric motor, which can be connected to a plus pole of a power supply of the electric motor, whilst the respective minus-pole segment is electrically connected to a minus-pole terminal of the electric motor, which can be connected to a minus pole of the power supply. By contrast, the respective insulator segment is configured in an electrically insulating manner and arranged between one plus-pole segment and one minus-pole segment in the circumferential direction in each case. By means of the construction suggested here, when the rotor is rotating, the coil arrangement assigned via the respective first slip ring or the respective associated coil strand is alternately connected via the respective contact element to the minus pole and the plus pole of the power supply, as a result of which a rotating magnetic field with alternating polarity can be realised.

In a further development, each of one magnetic north pole and one magnetic south pole can define a magnetic pole pair within the magnet arrangement, the number of plus-pole segments and the number of minus-pole segments then preferably being equal to the number of magnetic pole pairs. For example, only one single pole pair is present on the rotor, so that then the respective second slip ring comprises exactly one plus-pole segment and exactly one minus-pole segment. As a result, it is possible in particular to arrange the contact element arrangement fixedly on the rotor, so that the rotational speed of the rotor matches the rotational speed of the contact element arrangement.

Alternatively, an embodiment is also conceivable, in which the respective slip ring group or the entire slip ring arrangement comprises exactly three slip rings, namely a first slip ring, which is electrically connected to a plus-pole terminal of the electric motor, which can be connected to a plus pole of a power supply of the electric motor, a second slip ring, which is electrically connected to a minus-pole terminal of the electric motor, which can be connected to a minus pole of the power supply, and a third slip ring, which is segmented in the circumferential direction and comprises a plurality of insulator segments and a plurality of coil segments, which are electrically connected to the coil arrangement and alternate in the circumferential direction. Furthermore, in an embodiment of this type, at least one contact element is provided, which electrically connects the first slip ring to the third slip ring, at least one further contact element being provided, which connects the second slip ring to the third slip ring. An embodiment of this type manages with a reduced number of slip rings inside the slip ring arrangement, as different coils or different coil strands can be controlled by means of the conductor segments of the third slip ring, which is expediently arranged axially between the first slip ring and the second slip ring.

In a further alternative embodiment, it can be provided that the slip ring arrangement has only one single, common slip ring, which is segmented in the circumferential direction and has at least one plus-pole segment, which is electrically connected to a plus-pole terminal of the electric motor, which can be connected to a plus pole of a power supply of the electric motor; at least one minus-pole segment, which is electrically connected to a minus-pole terminal of the electric motor, which can be connected to a minus pole of the power supply; at least one coil segment, which is electrically connected to the coil arrangement; and at least one electrically insulating insulator segment, the various segments following one another in the circumferential direction such that in each case, one coil segment is arranged between a plus-pole segment and a minus-pole segment and in each case an insulator segment is arranged between a plus-pole segment and a minus-pole segment. An extremely compact structure for the contact commutation results in the axial direction owing to the use of only one single, common slip ring.

In an advantageous embodiment, it can be provided that within the coil arrangement, a winding, which forms a single coil or a plurality of coils connected in series, defines a coil strand, the coil arrangement having a plurality of coil strands. The common slip ring then has a plurality of coil segments, each coil segment being electrically connected to just one coil strand, whilst each coil strand is electrically connected to at least one coil segment. Thus, a plurality of coils or a plurality of coil strands can be commutated by means of the common slip ring.

In a further alternative advantageous embodiment, it can be provided that within the coil arrangement, a winding, which forms a single coil or a plurality of coils connected in series, defines a coil strand, the coil arrangement having a plurality of coil strands. In this case, the slip ring arrangement has exactly two slip rings, a first slip ring being segmented in the circumferential direction, and has a plurality of plus-pole segments, which are in each case electrically connected to a plus-pole terminal of the electric motor, which can be connected to a plus pole of a power supply of the electric motor, and each coil strand has at least one coil segment, which is electrically connected to the respective coil strand, the various segments being electrically insulated with respect to one another in the circumferential direction. Furthermore, a second slip ring is segmented in the circumferential direction, and has a plurality of minus-pole segments, which are in each case electrically connected to a minus-pole terminal of the electric motor, which can be connected to a minus pole of the power supply, and each coil strand has at least one coil segment, which is electrically connected to the respective coil strand, the various segments being electrically insulated with respect to one another in the circumferential direction. In this design, a larger number of coils and pole pairs can be controlled with a compact construction, as a result of which the electric motor can generate larger torques. In addition, the risk of dead spots, from which the electric motor cannot be started or can only be started with a very large current, can be reduced thereby.

According to an advantageous development, in the first slip ring, the various segments can follow one another in the circumferential direction such that at least one coil segment is arranged between two plus-pole segments, whilst in the second slip ring, the various segments can follow one another in the circumferential direction such that at least one coil segment is arranged between two minus-pole segments. A reliable commutation is supported as a result.

Additionally or alternatively, it can be provided that the first slip ring has an electrically insulating insulator segment for each coil segment, the various segments following one another in the circumferential direction such that each coil segment adjoins an insulator segment on the one side and a plus-pole segment on the other side. Analogously, it can be provided that the second slip ring has an electrically insulating insulator segment for each coil segment, the various segments following one another in the circumferential direction such that each coil segment adjoins an insulator segment on the one side and a minus-pole segment on the other side. By using such insulator segments, the distribution of the coil segments along the circumference can take place relatively simply, so that the risk of the aforementioned dead points between stator and rotor is reduced.

Furthermore, to improve the starting behaviour, it can be provided that the respective insulator segment in the circumferential direction is larger than the respective plus-pole segment and/or than the respective minus-pole segment and/or than the respective coil segment. Additionally or alternatively, it can be provided that the respective coil segment in the circumferential direction is the same size as the respective plus-pole segment and/or as the respective minus-pole segment.

A different embodiment suggests that in the first slip ring, each coil segment adjoins a plus-pole segment on both sides in the circumferential direction, whilst in the second slip ring, each coil segment adjoins a minus-pole segment on both sides in the circumferential direction. This measure also reduces the risk of dead spots of the rotor.

According to a development, it can be provided that the respective coil segment in the circumferential direction is smaller than the respective plus-pole segment and/or than the respective minus-pole segment.

According to a different embodiment, it can be provided that in the first slip ring, a plurality of coil segments, which follow one another in the circumferential direction and are only separated from one another by plus-pole segments, are assigned to each coil strand, a plurality of coil segments, which follow one another in the circumferential direction and are only separated from one another by minus-pole segments, being assigned to each coil strand in the second slip ring. This also reduces the risk of dead spots of the rotor.

According to a preferred development, it can be provided that at least one of the coil segments, which is assigned to one of the coil strands, adjoins a different coil segment in the circumferential direction, which is assigned to a different coil strand. The mutually adjoining coil segments are in this case expediently electrically insulated with respect to one another.

Particularly advantageous is a development, in which coil segments which adjoin plus-pole segments on both sides in the circumferential direction are the same size in the circumferential direction as the plus-pole segments, whilst coil segments which adjoin a different coil segment in the circumferential direction are half as large as the plus-pole segments, coil segments, which adjoin minus-pole segments on both sides in the circumferential direction, being the same size in the circumferential direction as the minus-pole segments, whilst coil segments which adjoin a different coil segment in the circumferential direction are half as large as the minus-pole segments. The start-up behaviour of the rotor is improved as a result.

Advantageously, the two slip rings can be arranged relative to one another such that the coil segments of the first slip ring are arranged offset in the circumferential direction with respect to the coil segments of the second slip ring with regard to the coil strands assigned to them. This measure also reduces the risk of dead spots and improves the start-up behaviour of the rotor.

Furthermore, it can be provided that the contact elements which are in contact with the respective slip ring are arranged axially between the two slip rings, as a result of which the contact commutation has a very small construction in the radial direction.

According to an advantageous development, it can be provided that a first contact element in contact with the first slip ring is axially adjacent to a second contact element in contact with the second slip ring and is arranged electrically insulated therefrom. This feature also supports a compact design.

According to an advantageous development, the coil arrangement can be arranged axially offset to the slip ring arrangement on or in the housing. As a result, the electric motor has a comparatively compact construction in the radial direction.

In a different advantageous development, a winding, which forms a single coil or a plurality of coils connected in series, can define a coil strand. Depending on the configuration of the slip ring arrangement, a separate slip ring group can be provided for each coil strand, so that each coil strand is electrically connected to just one slip ring group. By means of this measure, in the case of appropriate commutation, a rotating magnetic field can be generated, which interacts with the magnetic field of the magnet arrangement to drive the rotor.

As mentioned, an embodiment is preferred in which the contact element arrangement is arranged fixedly on the rotor, so that the rotational speed of the rotor matches the rotational speed of the contact element arrangement.

In an alternative embodiment, the contact element arrangement can be arranged fixedly on a contact element shaft, which is drive-connected via a gearbox to the rotor of the electric motor. It is possible in particular by means of this method to commutate a larger number of pole pairs by means of a correspondingly increased rotational speed of the contact elements, whilst the number of plus-pole segments and minus-pole segments in the respective second slip ring is smaller than the number of pole pairs.

An axially compact design is supported if the respective contact element radially makes contact with the respective slip ring. By contrast, a radially compact design can be achieved if the respective contact element axially makes contact with the respective slip ring. Furthermore, it has been shown that axially contacting contact elements can be produced very much more precisely than radially contacting contact elements, as a result of which the sliding in is facilitated and the contacting is improved.

Particularly expedient is a design in which the slip ring is integrated into an axial end face of the stator or a housing containing the stator in a rotationally fixed manner.

According to another advantageous development, the respective contact element can be arranged on the rotor via a contact element support fastened on the rotor, a spring being arranged in the contact element support, which radially or axially pretensions the contact element against the respective slip ring. As a result, the functional reliability of the brush commutation can be improved.

In principle, the adjacent segments in the respective slip ring can adjoin one another in the circumferential direction in any desired manner. Preferred is an embodiment, in which at least two adjacent segments in the circumferential direction adjoin one another in a plane which contains the rotational axis of the rotor. As a result, the segments can be of relatively short construction in the circumferential direction. Alternatively, it may be expedient, for example in order to improve the starting up of the rotor in the case of axial commutation, that at least two adjacent segments in the circumferential direction adjoin one another in a plane, which is inclined with respect to a plane containing the rotational axis of the rotor and runs parallel to the rotational axis of the rotor. Alternatively, it may be expedient, for example in order to improve the starting up of the rotor in the case of radial commutation, that at least two adjacent segments in the circumferential direction adjoin one another in a plane which is inclined with respect to a plane running perpendicularly to the rotational axis of the rotor and intersects the rotational axis of the rotor. The inclined boundary surfaces simultaneously ensure that the length of the contact elements measured in the circumferential direction can be reduced, as a result of which production tolerances have less of an effect.

A vehicle component according to the invention is characterised by at least one actuator and also an electric motor of the previously described type, which is drive-connected to the respective actuator. Preferably, the vehicle component is a throttle apparatus of a ventilation system or a flap apparatus of a ventilation system. Likewise, the vehicle component can be a turbine or an exhaust turbocharger, whereby the respective actuator can then be a variable turbine geometry or a wastegate valve.

Further important features and advantages of the invention can be found in the sub-claims, the drawings and the associated description of the figures using the drawings.

It is self-evident that the features mentioned above and those still to be mentioned below can be used not only in the respectively specified combination, but also in other combinations or alone, without departing from the scope of the present invention.

Preferred exemplary embodiments of the invention are illustrated in the drawings and are described in more detail in the following description, identical reference numbers referring to identical or similar or functionally identical components.

BRIEF DESCRIPTION OF THE DRAWINGS

In the figures, in each case schematically,

FIG. 12 shows a commutation schematic of the electric motor of the embodiment according to FIG. 11 with associated unrolled schematic of the slip ring (a), with associated contact diagram (b) for a commutation period, with associated coil contact schematic (c) for the commutation period and with a coil wiring schematic (d)

DETAILED DESCRIPTION

Figure 1:
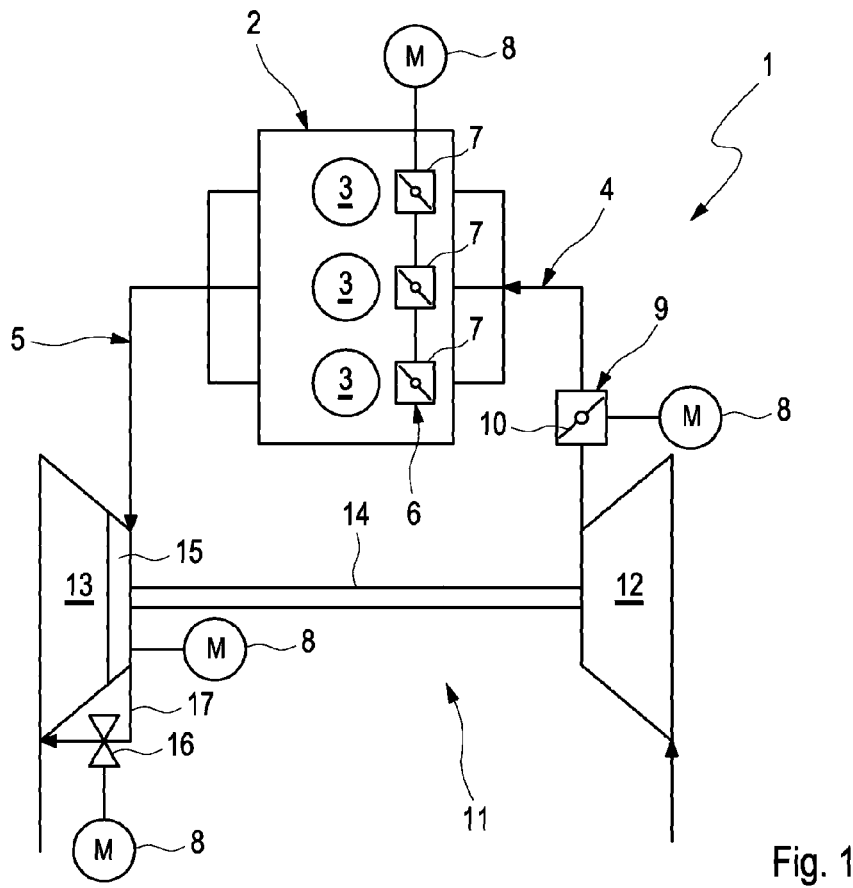
FIG. 1 shows a greatly simplified schematic representation, similar to a circuit diagram, of an internal combustion engine with a plurality of vehicle components.

According to FIG. 1, an internal combustion engine 1, which is preferably arranged in a vehicle, comprises an engine block 2 with a plurality of combustion chambers 3, a ventilation system 4 for supplying the combustion chambers 3 with fresh air and an exhaust system 5 for evacuating exhaust gas from the combustion chambers 3. A flap device 6 can be arranged on the engine block 2, which flap device comprises a flap 7 for each combustion chamber 3, which flap can be configured as a tumble flap or as a swirl flap, for example. The individual flaps 7 are actuators, which can be actuated or adjusted with the aid of an electric motor 8. In the example, the ventilation system 4 additionally contains a throttle device 9, the throttle 10 of which can be adjusted with the aid of a further electric motor 8.

The internal combustion engine 1 is additionally conceived as a supercharged internal combustion engine 1 here. In the present case, the internal combustion engine 1 is to this end equipped with an exhaust turbocharger 11, which comprises a compressor 12 integrated into the ventilation system 4 and a turbine 13 integrated into the exhaust system 5, which are connected to one another via a common drive shaft 14. The turbine 13 can be equipped with a variable turbine geometry 15, with the aid of which an airflow direction and an airflow velocity of the exhaust gas can be changed with respect to a turbine wheel of the turbine 13. An electric motor 8 can in turn be provided to actuate the variable turbine geometry 15. The turbine 13 is here equipped with a wastegate valve 16, with the aid of which a bypass 17 for bypassing the turbine wheel can be controlled. An electric motor 8 can in turn be provided for actuating the wastegate valve 16.

Figure 2:
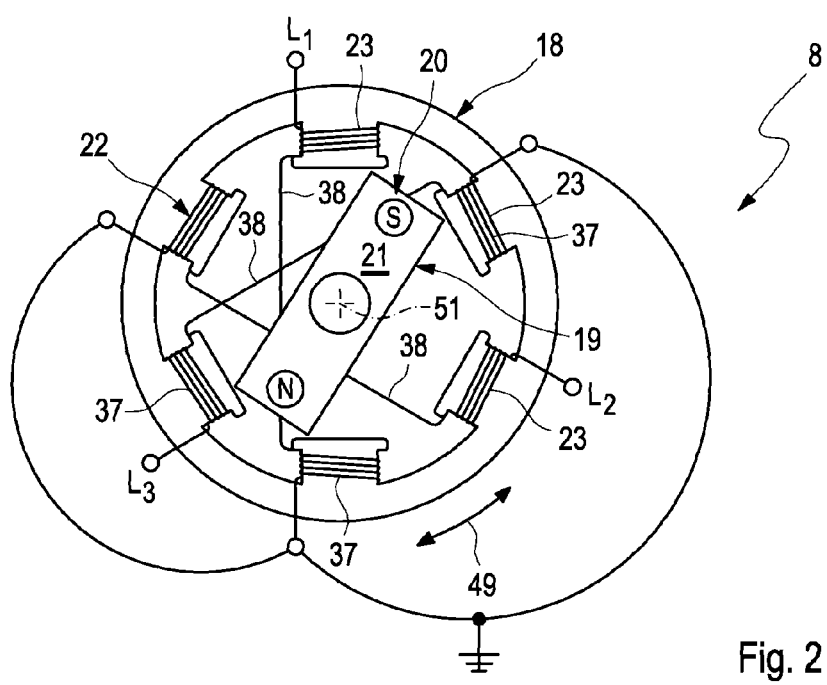
FIG. 2 shows a greatly simplified cross section of an electric motor.
Figure 3:
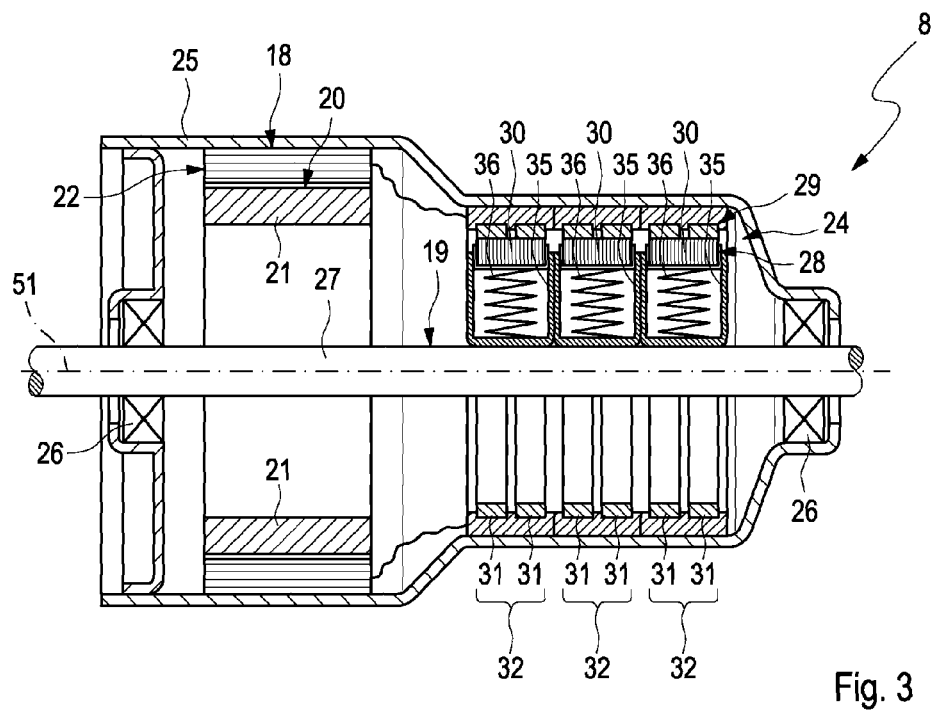
FIG. 3 shows a greatly simplified longitudinal section of an electric motor.
Figure 4:
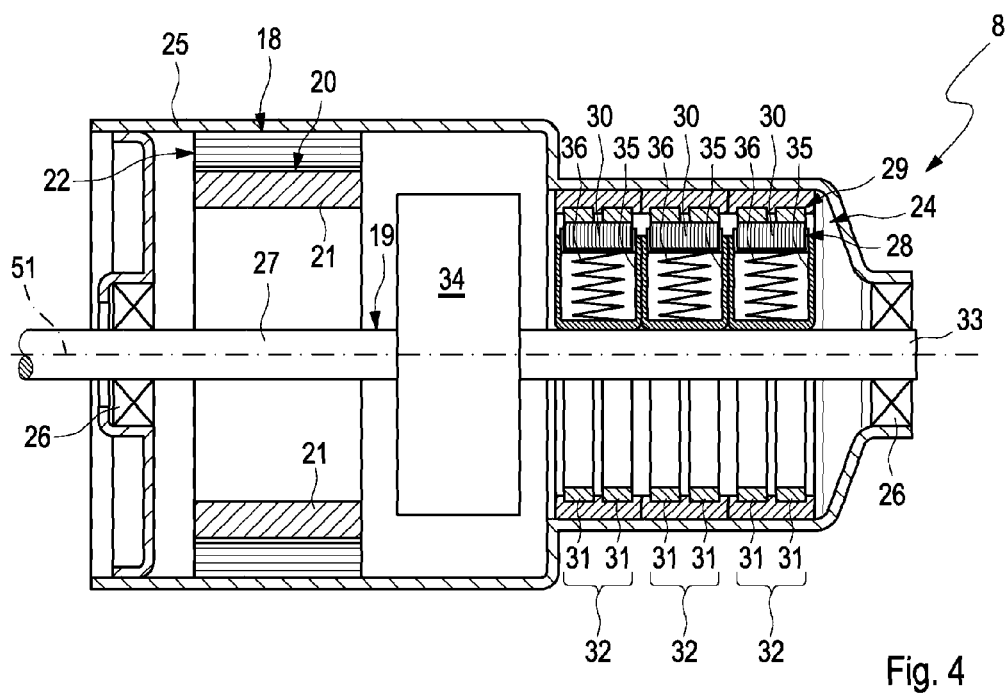
FIG. 4 shows a further greatly simplified longitudinal section of the electric motor in a different embodiment.

According to FIGS. 2 to 4, the electric motor 8 can be configured as an internal rotor and accordingly have an external stator 18 and an internal rotor 19. The rotor 19 is rotatably mounted about a rotational axis 51 relatively to the stator 18 and is provided with a magnet arrangement 20 arranged fixedly thereon, which comprises at least one permanent magnet 21. The stator 18 is permanently equipped with a coil arrangement 22, which comprises at least one electric coil 23. Preferably, the electric motor 8 is a direct-current motor. According to FIGS. 3 and 4, the electric motor 8 is equipped with a contact commutation 24, in order to be able to control the coil arrangement 22.

The electric motor 8 further comprises a housing 25, in which the stator 18 is arranged and in which the rotor 19 is rotatably mounted. Corresponding bearings are designated with 26 here and arranged on end faces of the housing 25 in such a manner that the stator 18 and the contact commutation 24 are arranged axially between the two bearings 26.

The rotor 19 comprises a drive shaft 27, via which the respective actuator to be driven with the aid of the electric motor 8 can be drive-connected to the electric motor 8.

According to FIGS. 3 to 7, the contact commutation 24 comprises a contact element arrangement 28 and a slip ring arrangement 29. The contact element arrangement 28 is arranged rotatably with the rotor 19 and comprises at least one contact element 30. The respective contact element 30 is expediently a brush, e.g. a carbon brush. The slip ring arrangement 29 is arranged in a rotationally fixed manner on the housing 25 and comprises at least one slip ring 31. In the example of FIGS. 8 to 12, only one slip ring 31 is provided. In all other examples, two or more slip rings 31 are provided. The slip ring arrangement 29 is electrically connected to the coil arrangement 22 in a suitable manner. In the examples of FIGS. 3 to 7, at least two slip rings 31 define a slip ring group 32 in each case. Within the respective slip ring group 32, at least two slip rings 31 are electrically connected to one another via at least one contact element 30.

The contact elements 30 are electrically insulated with respect to the rotor 19. The slip rings 31 are electrically insulated with respect to the housing 25.

As can be seen from the FIGS. 3 and 4, the coil arrangement 22 is arranged on or in the housing 25 axially offset with respect to the slip ring arrangement 29. Within the housing 25, the magnet arrangement 20 and the contact element arrangement 28 are also arranged axially offset with respect to one another.

In the embodiment shown in FIG. 3, a continuous rotor 19 or a continuous drive shaft 27 is provided, so that the magnet arrangement 20 and the contact element arrangement 28 are fixedly arranged on the same rotor 19 or on the same drive shaft 27. By contrast, FIG. 4 shows an embodiment, in which a contact element shaft 33 is provided in addition to the rotor 19 of the electric motor 8, on which shaft the contact element arrangement 28 is fixedly arranged. A gearbox 34 realises a drive connection with engine-speed step-up or step-down ratio between the rotor 19 of the electric motor 8 and the contact element shaft 33.

Figure 5:
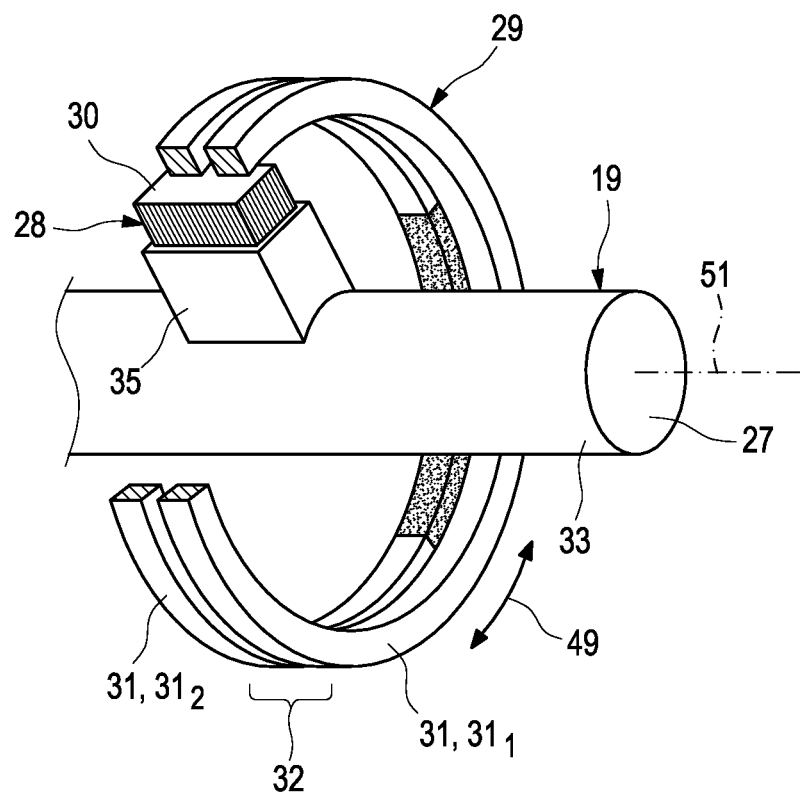
FIG. 5 shows an isometric view of a brush commutation.

According to FIGS. 3 to 5, within the contact element arrangement 28, the respective contact element 30 is arranged via a contact element support 35 on the rotor 19 or on the contact element shaft 33, the respective contact element support 35 being fixedly attached on the rotor 19 or on the contact element shaft 33. According to FIGS. 3 and 4, the contact element support 35 can expediently comprise a spring 36, which radially pretensions the contact element 30 radially outwards against the respective slip rings 31.

According to FIG. 2, a winding 37 can either form a single coil 23 or at least two coils 23 connected in series. In any case, the respective winding 37 defines a coil strand 38. In the embodiment shown in FIG. 2, three coil strands 38 are provided, in which the respective winding 37 forms two diametrically opposite coils 23 in each case. The three separately controllable coil strands 38 or coil pairs are in addition designated with $L_1$, $L_2$ and $L_3$ in FIGS. 2 and 6.

Figure 6:
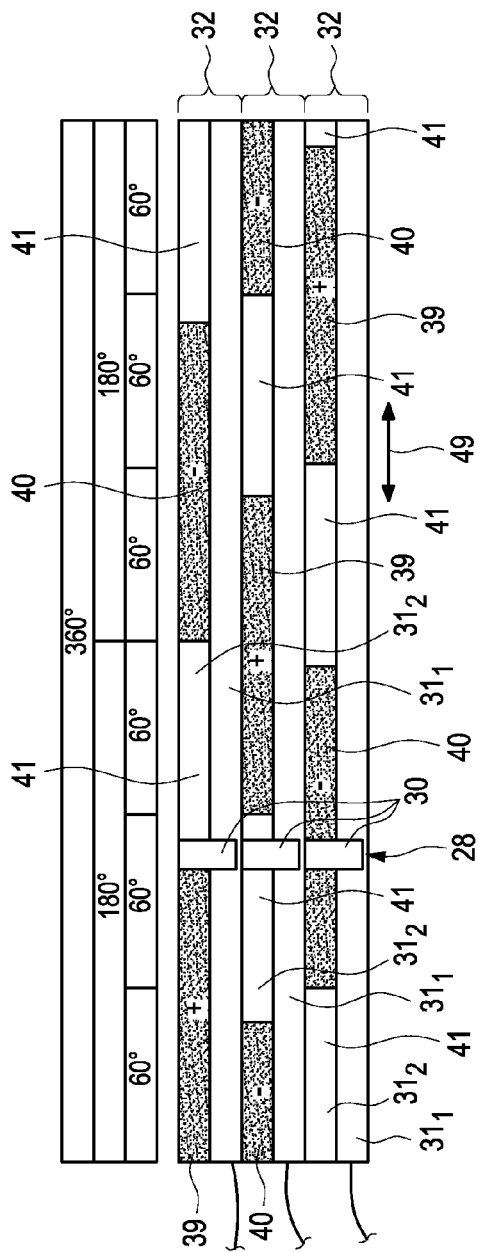
FIG. 6 shows an unwound commutation schematic for a three-stranded realisation of the electric motor.
Figure 6:
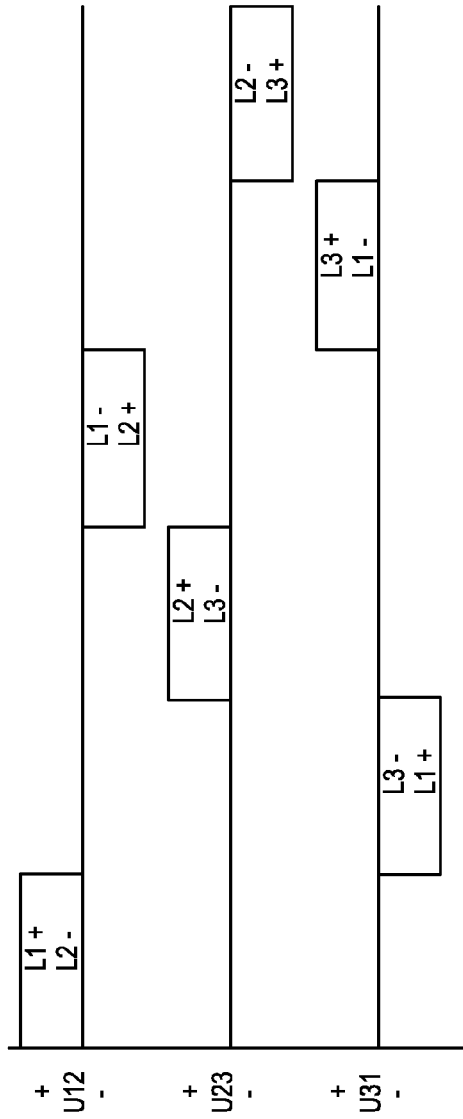
Figure 6:
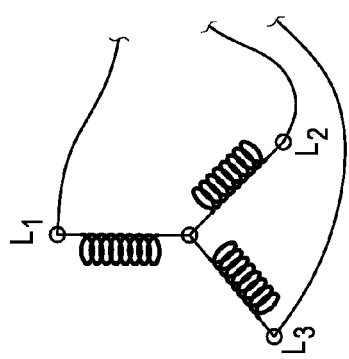

According to FIG. 6, a separate slip ring group 32 can then be provided for each coil strand $L_1$, $L_2$, $L_3$. Each coil strand $L_1$, $L_2$, $L_3$ is then connected to just one slip ring group 32.

According to FIGS. 5 and 6, each slip ring group 32 comprises exactly two slip rings 31, namely one first slip ring $31_1$ and one second slip ring $31_2$. The respective first slip ring $31_1$ is electrically connected to the coil arrangement 22 or to the associated coil strand 38 or $L_1$, $L_2$ or $L_3$. The respective second slip ring $31_2$ is segmented in the circumferential direction 49 and comprises at least one plus-pole segment 39, at least one minus-pole segment 40 and at least two insulator segments 41. The respective plus-pole segment 39 is electrically connected to a plus-pole terminal 42 of the electric motor 8 illustrated in FIG. 7, which can be connected to a plus pole 43 of an electrical power supply 44 of the electric motor 8. The respective minus-plus-pole segment 40 is electrically connected to a minus-pole terminal 45 of the electric motor 8 illustrated in FIG. 7, which can be connected to a minus pole 46 of the electrical power supply 44. The respective insulator segment 41 is configured in an electrically insulating manner and is arranged between one plus-pole segment 39 and one minus-pole segment 40 in the circumferential direction 49 in each case.

As can further be seen from FIGS. 5 and 6, the two slip rings $31_1$ and $31_2$ of the respective slip ring group 32 or of the respective slip ring pair 32 can then be electrically connected to one another with the aid of at least one contact element 30. In the case of three slip ring pairs 32, at least three contact elements 30 are correspondingly provided within the contact element arrangement 28.

According to FIG. 2, one magnetic North pole N and one magnetic South pole S in each case define a magnetic pole pair within the magnet arrangement 20. The number of plus-pole segments 39 and the number of minus-pole segments 40 is the same as the number of magnetic pole pairs in the embodiment shown in FIG. 6. In the example shown here, an electric motor 8 is therefore shown, which has a single magnetic pole pair and a three-stranded coil arrangement 22.

The varying polarity of the coil strands $L_1$, $L_2$, $L_3$ and also the rotation of the magnetic field generated thereby are also additionally illustrated in the unwinding of FIG. 6, which is created in that the contact element arrangement 28 rotates with respect to the slip ring arrangement 29 and runs over the successive different segments 39, 40, 41 of the respective second slip ring $31_2$ and electrically connects to the respective first slip ring $31_1$.

Figure 7:
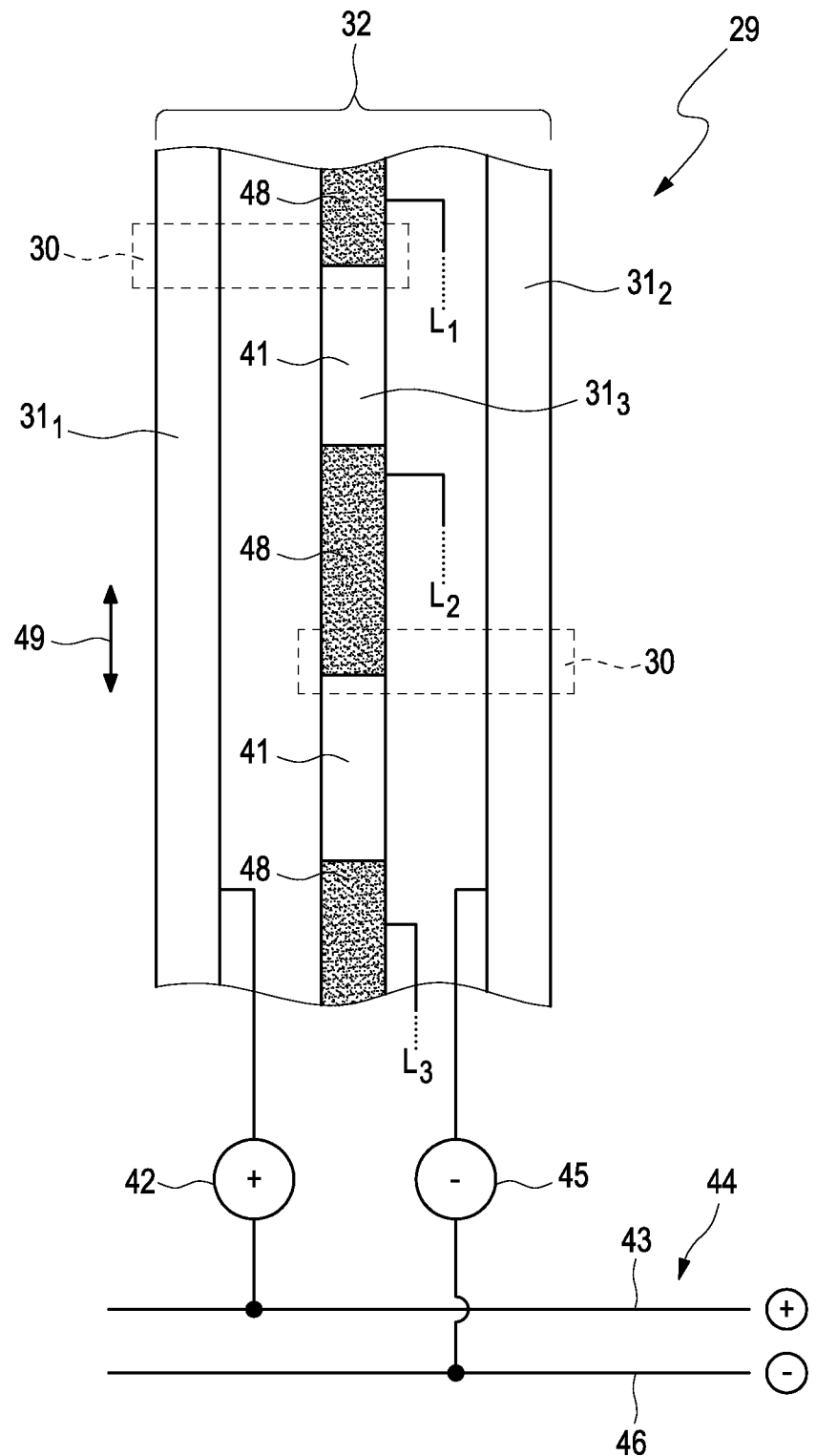
FIG. 7 shows a simplified side view of the brush commutation in a different embodiment.
Figure 8:
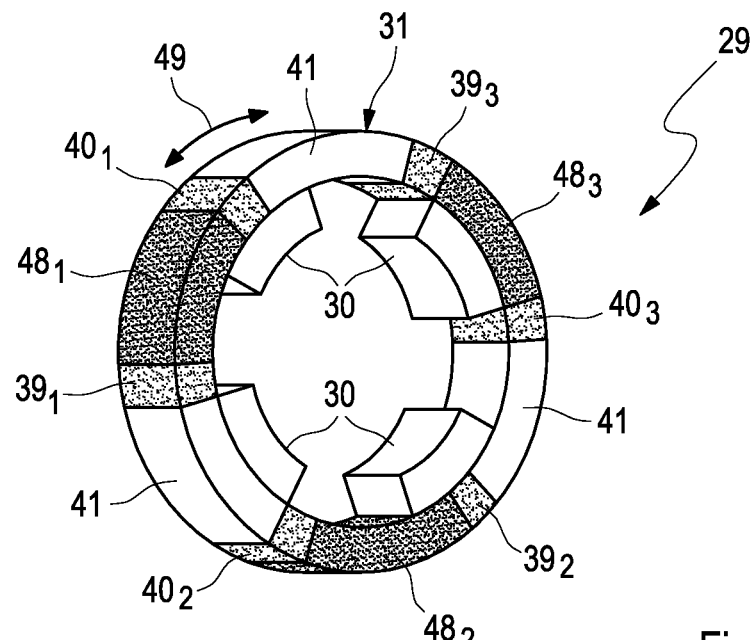
FIG. 8 shows an isometric view of a slip ring in a different embodiment.

FIG. 7 then shows an alternative embodiment, in which the respective slip ring group 32 comprises exactly three slip rings 31, namely a first slip ring $31_1$, a second slip ring $31_2$ and also a third slip ring $31_3$ arranged axially between the first slip ring $31_1$ and the second slip ring $31_2$. The first slip ring $31_1$ is connected to the plus-pole terminal 42 of the electric motor 8. The second slip ring $31_2$ is connected to the minus-pole terminal 45 of the electric motor 8. The third slip ring $31_3$ is segmented in the circumferential direction 49 in such a manner that it comprises a plurality of insulator segments 41 and a plurality of coil segments 48. The coil segments 48 and the insulator segments 41 alternate in the circumferential direction 49. The insulator segments 41 are configured in an electrically insulating manner. The coil segments 48 are electrically connected to the coil arrangement 22. In particular, the coil segments 48 are electrically connected to the different coil strands $L_1, L_2, L_3$ such that they alternate with one another.

At least one first contact element 30, which is only indicated in FIG. 7 with an interrupted line, electrically connects the first slip ring $31_1$ to the third slip ring $31_3$. At least one second contact element 30, which is only indicated in FIG. 7 with an interrupted line, electrically connects the second slip ring $31_2$ to the third slip ring $31_3$.

By means of a suitable number of conductor segments 48, all coil strands 38 or $L_1, L_2, L_3$ can be controlled using this one slip ring group 32 in this embodiment, so that the slip ring arrangement 29 only comprises these three slip rings 31.

In the embodiments shown in the FIGS. 8 to 12, the slip ring arrangement 29 only has a single, common slip ring 31, which is segmented in the circumferential direction 49. The slip ring 31 has at least one plus-pole segment 39, which is electrically connected to the plus-pole terminal 42 of the electric motor 8, which can be connected to the plus pole 43 of the power supply 44 of the electric motor 8, at least one minus-pole segment 40, which is electrically connected to the minus-pole terminal 45 of the electric motor 8, which can be connected to the minus pole 46 power supply 44, at least one coil segment 48, which is electrically connected to the coil arrangement 22, and at least one electrically insulating insulator segment 41. The various segments 39, 40, 41, 48 follow one another in the circumferential direction 49 in such a manner that one coil segment 48 is arranged between one plus-pole segment 39 and one minus-pole segment 40 in each case and one insulator segment 41 is arranged between one plus-pole segment 39 and one minus-pole segment 40 in each case. An extremely compact structure for the contact commutation results in the axial direction due to the use of only one single, common slip ring 31. The contact commutation can take place in principle according to FIG. 8 again by means of radially internally arranged contact elements 30 or else according to FIG. 10 by means of axially arranged contact elements 30.

Here also, the plus-pole segments 39 and the minus-pole segments 40 are electrically insulated with respect to the respective coil segment 48.

In an advantageous embodiment, it can be provided that within the coil arrangement 22, a winding 37, which forms a single coil 23 or a plurality of coils 23 connected in series, defines a coil strand 38, the coil arrangement 22 having a plurality of coil strands 38. In the example, the common slip ring 31 has a plurality of coil segments 48, each coil segment 48 being electrically connected to just one coil strand 38, whilst each coil strand 38 is electrically connected to at least one coil segment 48. Thus, a plurality of coils 23 or a plurality of coil strands 38 can be commutated by means of the common slip ring 31. In the example, three coil strands 38 are provided, which are commutated by means of three coil segments $48_1$, $48_2$, $48_3$. Correspondingly, three plus-pole segments $39_1$, $39_2$, $39_3$ and three minus-pole segments $40_1$, $40_2$, $40_3$ are also provided here.

Figure 9:
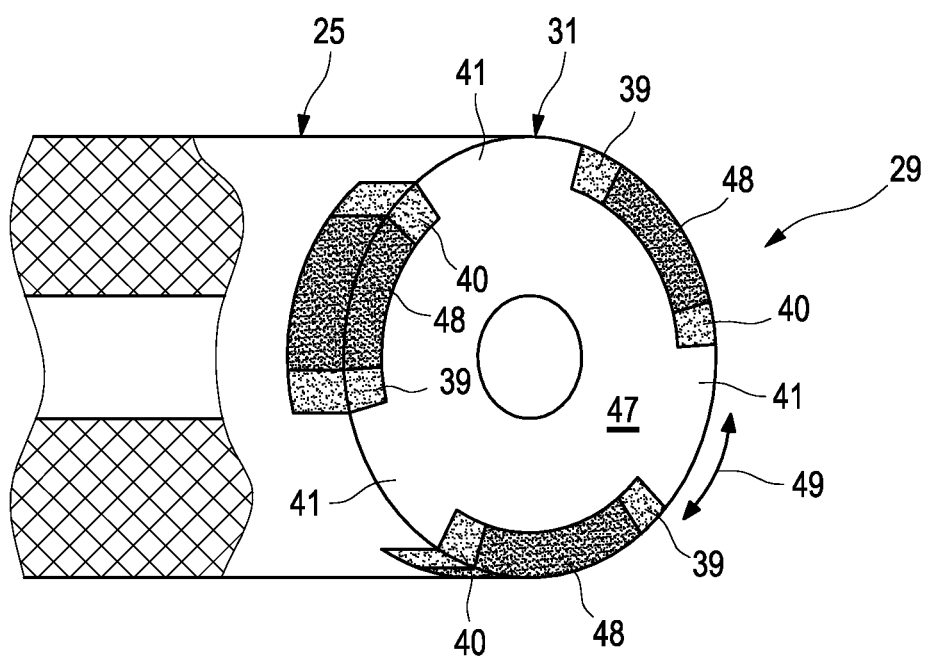
FIG. 9 shows an isometric view of a rotor in the embodiment according to FIG. 8.
Figure 10:
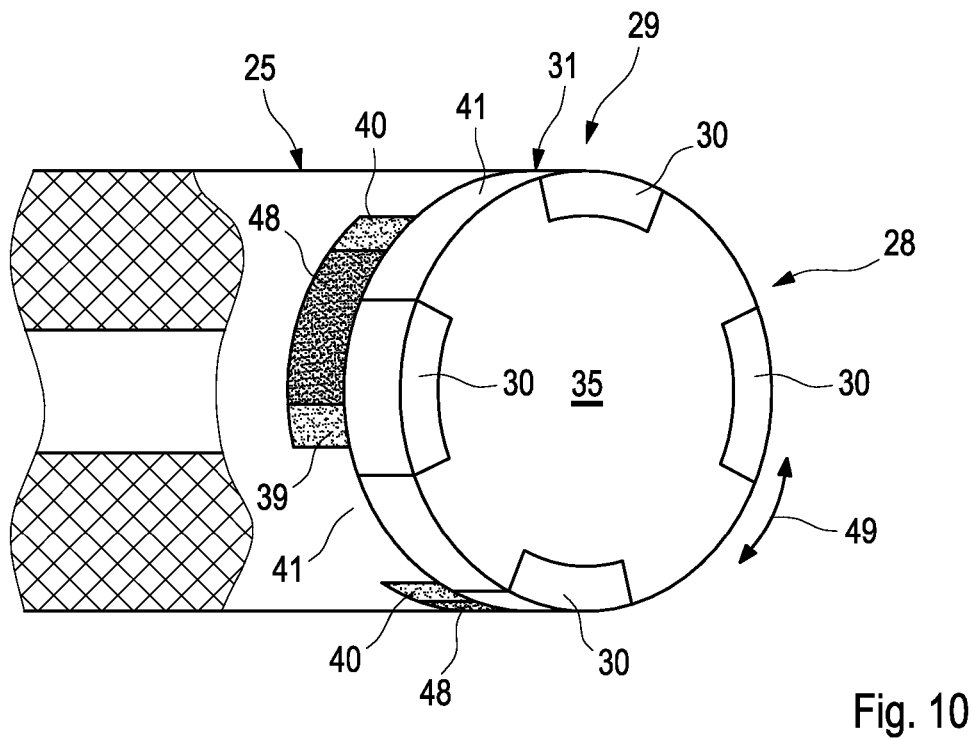
FIG. 10 shows an isometric view of the rotor with a contact element arrangement in the embodiment according to FIG. 8.
Figure 11:
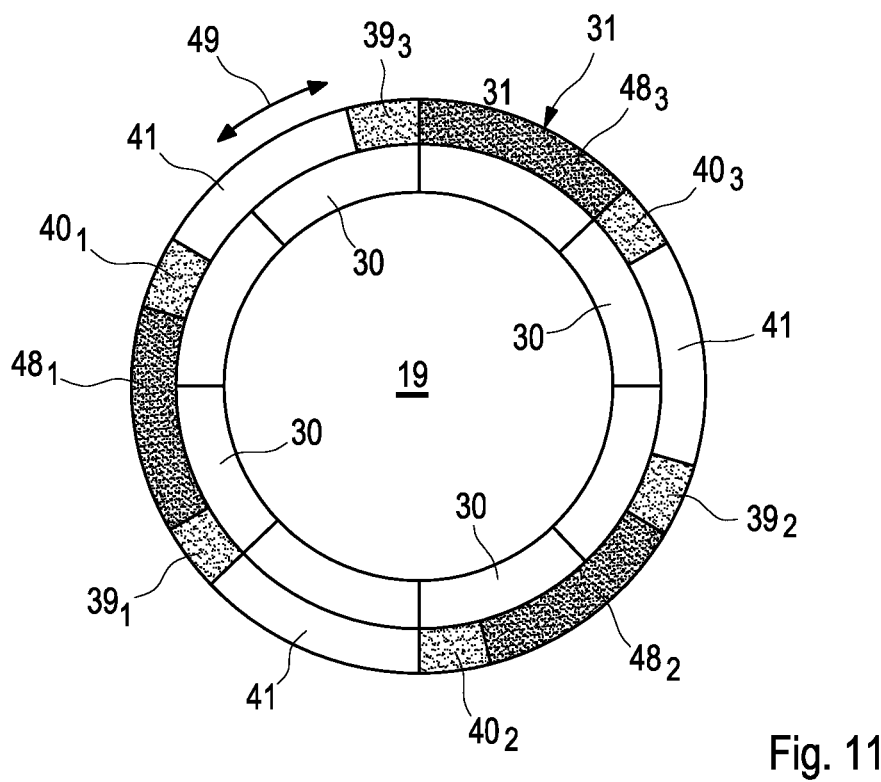
FIG. 11 shows a greatly simplified cross section of the electric motor in the embodiment according to FIG. 8.

According to FIGS. 9 and 10, the slip ring arrangement 29 can be integrated into the housing 25 or into an axial end face 47 of the housing 25. In the example, the insulator segments 41 are formed integrally on the housing 25 to this end. To this end, the housing 25 must be produced from an electrically insulating material, e.g. from plastic.

According to FIG. 10, the contact element arrangement 28 can have a disc-shaped contact element support 35, into which the individual contact elements 30 are integrated.

The example of FIGS. 8 to 12 starts from an electric motor 8, the rotor of which 19 has eight permanent magnets 21 and thus a plus-pole number of four. Furthermore, three coil strands 38 are provided, which are commutated using four contact elements 30. The commutation schematic according to FIGS. 12a, 12b, 12c is to be understood in connection with the wiring according to FIG. 12d analogously to the commutation schematic of FIGS. 6a, 6b and 6c and in this regard is self-explanatory.

In the embodiments of FIGS. 13 to 24, it can be provided that within the coil arrangement 22, a winding 37, which contains a single coil 23 or a plurality of coils 23 connected in series, defines a coil strand 38, the coil arrangement 29 again having a plurality of coil strands 38. The slip ring arrangement 29 in this case has exactly two slip rings $31_1$, $31_2$. A first slip ring $31_1$ is segmented in the circumferential direction 49, and has a plurality of plus-pole segments 39, which are in each case electrically connected to the plus-pole terminal 42 of the electric motor 8, which can be connected to the plus pole 43 of the power supply 44 of the electric motor 8, and each coil strand 38 has at least one coil segment 48, which is electrically connected to the respective coil strand 38, the various segments 39, 48 being electrically insulated with respect to one another in the circumferential direction 49. Furthermore, a second slip ring $31_2$ is segmented in the circumferential direction 49, and has a plurality of minus-pole segments 40, which are in each case electrically connected to a minus-pole terminal 45 of the electric motor 8, which can be connected to the minus pole 46 of the power supply 44, and each coil strand 38 has at least one coil segment 48, which is electrically connected to the respective coil strand 38. Here also, the various segments 40, 48 are electrically insulated with respect to one another in the circumferential direction 49. In the examples of FIGS. 13 to 24, exactly three coil strands 38 are provided in each case, the first slip ring $31_1$ and the second slip ring $31_2$ having two associated coil segments 48 for each coil strand 38, so that in total six coil segments 48 are present, namely two first coil segments $48_1$, two second coil segments $48_2$ and two third coil segments $48_3$.

In accordance with advantageous developments according to FIGS. 13 to 21, in the first slip ring $31_1$, the various segments 39, 48 can follow one another in the circumferential direction 49 such that at least one coil segment 48 is arranged between two plus-pole segments 39, whilst in the second slip ring $31_2$, the various segments 40, 48 can follow one another in the circumferential direction 49 such that at least one coil segment 48 is arranged between two minus-pole segments 40. A reliable commutation is supported as a result.

Figure 13:
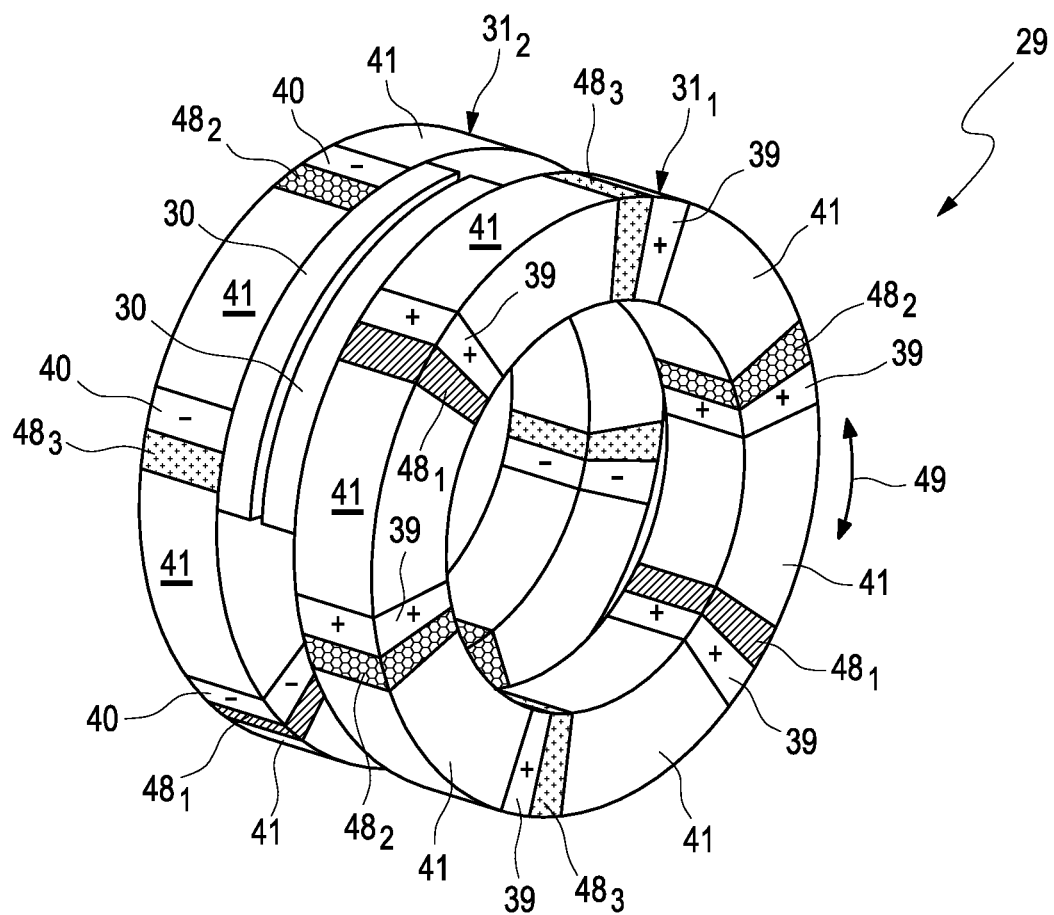
FIG. 13 shows an isometric view of a slip ring arrangement in the case of axial commutation.
Figure 14:
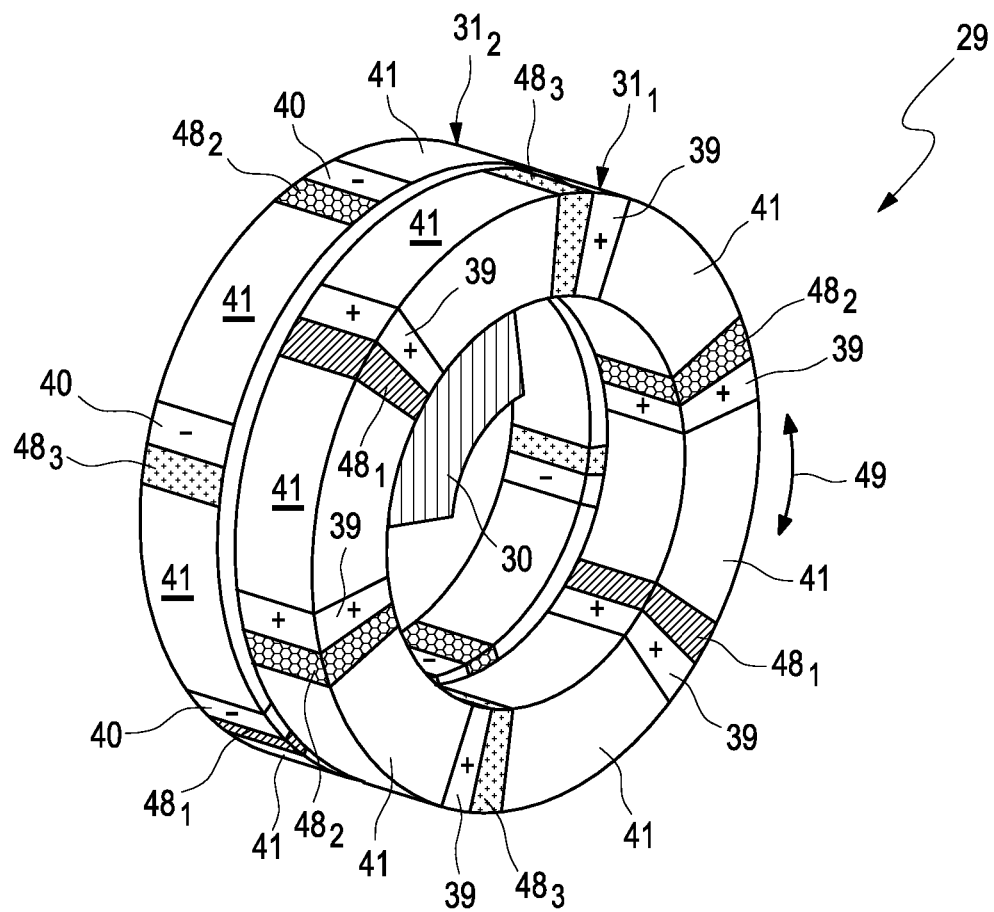
FIG. 14 shows an isometric view of the slip ring arrangement from FIG. 13, but in the case of radial commutation.
Figure 15:
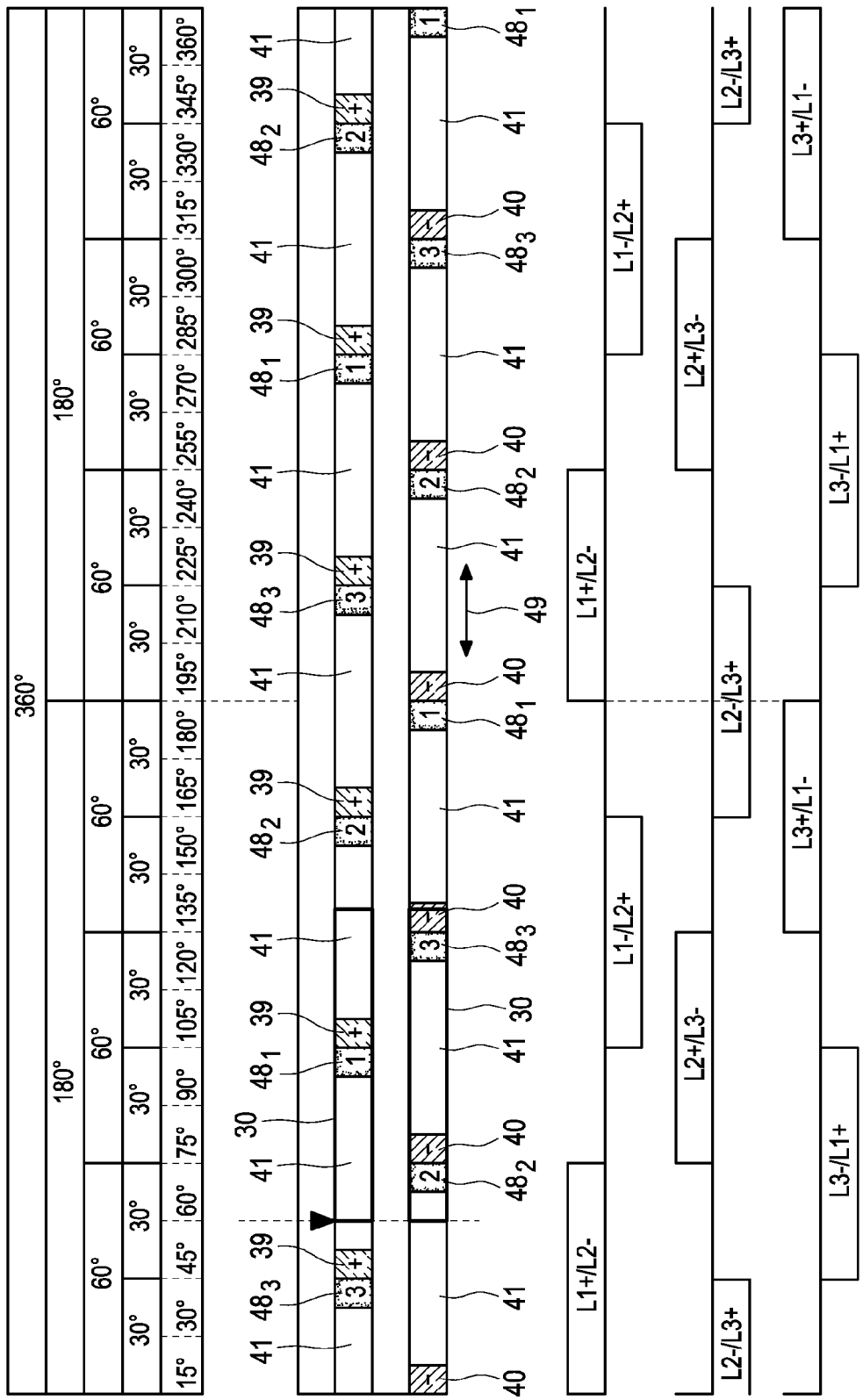
FIG. 15 shows a commutation schematic for the embodiments of FIGS. 13 and 14.

Additionally, according to the embodiments of FIGS. 13 to 15, it can be provided, that the first slip ring $31_1$ has an electrically insulating insulator segment 41 for each coil segment 48, the various segments 39, 41 and 48 following one another in the circumferential direction 49 such that each coil segment 48 adjoins an insulator segment 41 on the one side and a plus-pole segment 39 on the other side. Analogously, it can be provided, that the second slip ring $31_2$ has an electrically insulating insulator segment 41 for each coil segment 48, the various segments 40, 41, 48 following one another in the circumferential direction 49 such that each coil segment 48 adjoins an insulator segment 41 on the one side and a minus-pole segment 40 on the other side.

Furthermore, it can be provided that the respective insulator segment 41 in the circumferential direction 49 is larger than the respective plus-pole segment 39 and/or than the respective minus-pole segment 40 and/or than the respective coil segment 48. Additionally or alternatively, it can be provided that the respective coil segment 48 in the circumferential direction 49 is the same size as the respective plus-pole segment 39 and/or as the respective minus-pole segment 40.

A different embodiment according to FIGS. 16 to 21 suggests that in the first slip ring $31_1$, each coil segment 48 in the circumferential direction 49 adjoins a plus-pole segment 39 on both sides, whilst in the second slip ring $31_2$, each coil segment 48 in the circumferential direction 49 adjoins a minus-pole segment 40 on both sides.

Figure 16:
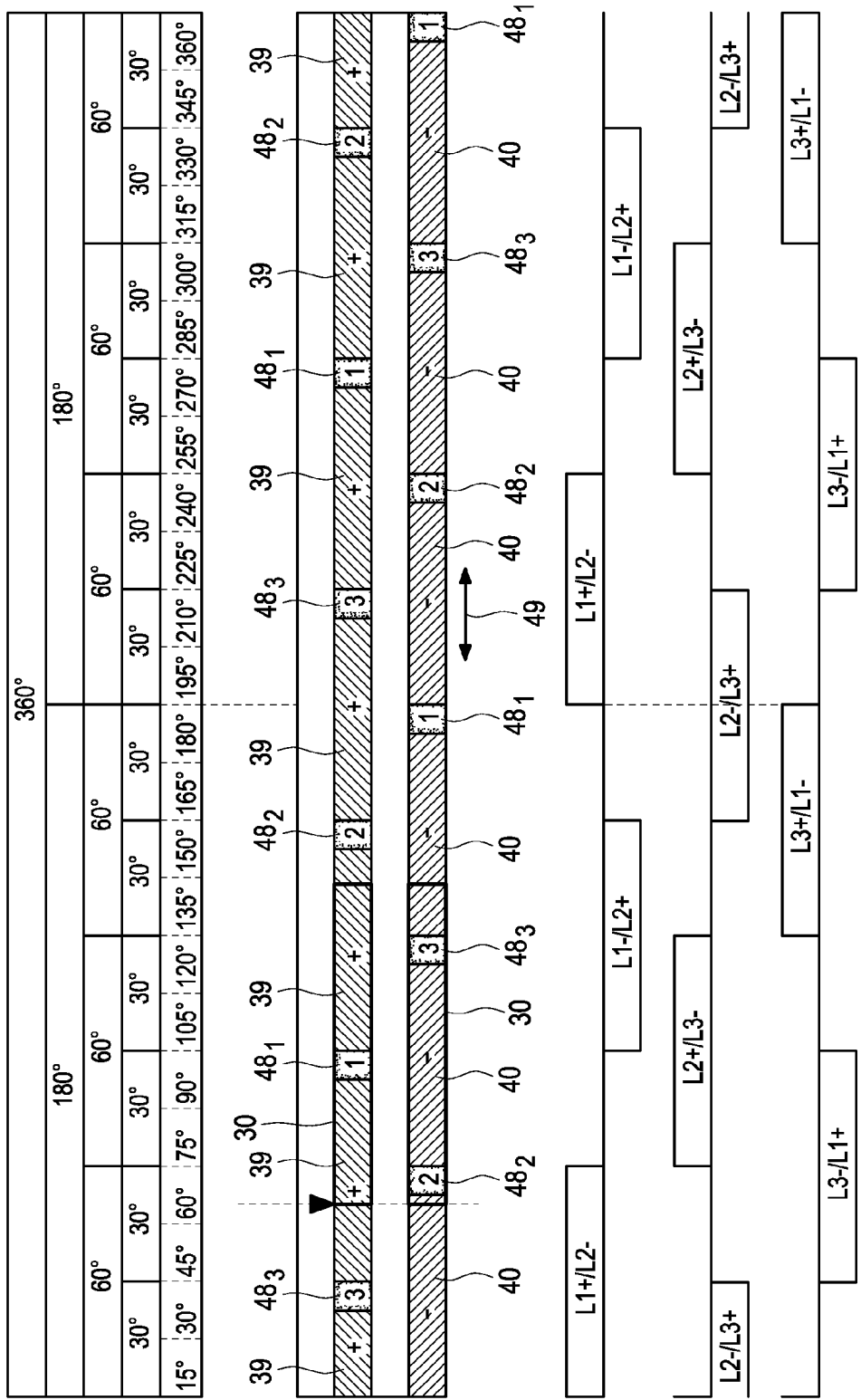
FIG. 16 shows a commutation schematic for the embodiments of FIGS. 17 and 18.
Figure 17:
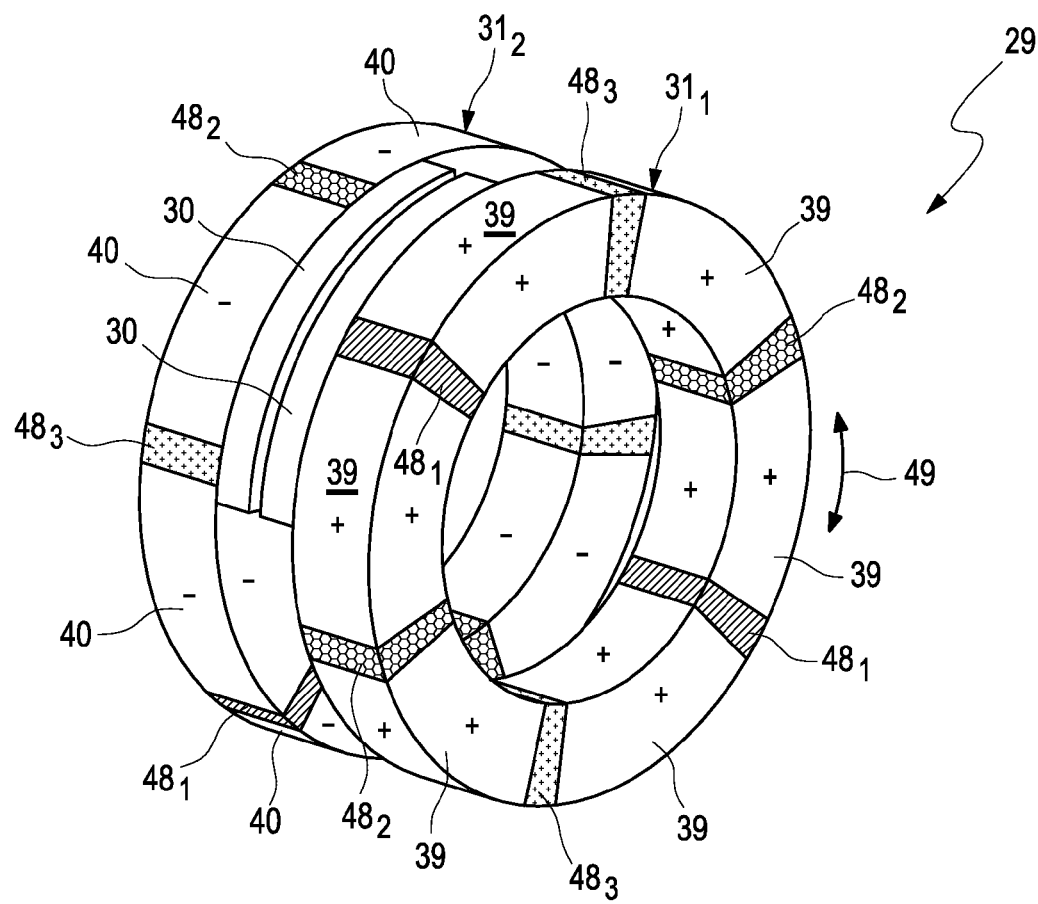
FIG. 17 shows an isometric view of a different slip ring arrangement in the case of axial commutation.
Figure 18:
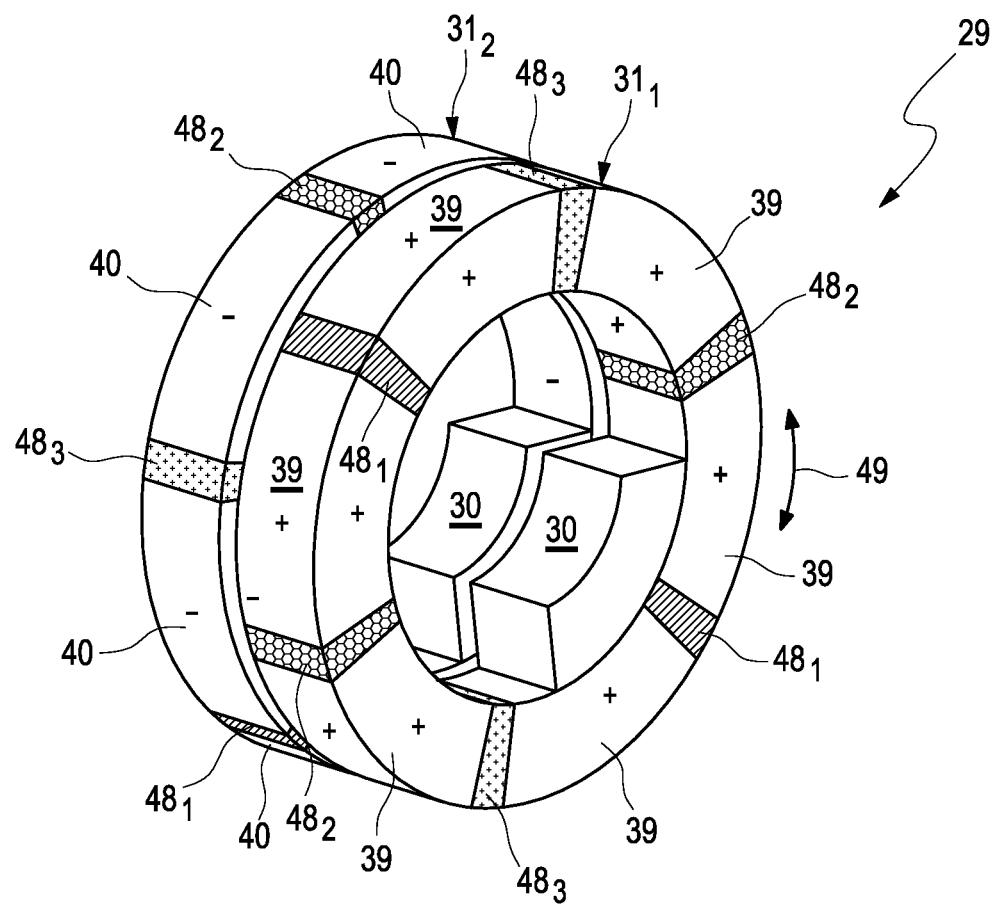
FIG. 18 shows an isometric view of the other slip ring arrangement from FIG. 17, but in the case of radial commutation.

According to a development, it can be provided in particular according to FIGS. 16 to 18 that the respective coil segment 48 in the circumferential direction 49 is smaller than the respective plus-pole segment 39 and/or than the respective minus-pole segment 40.

Figure 19:
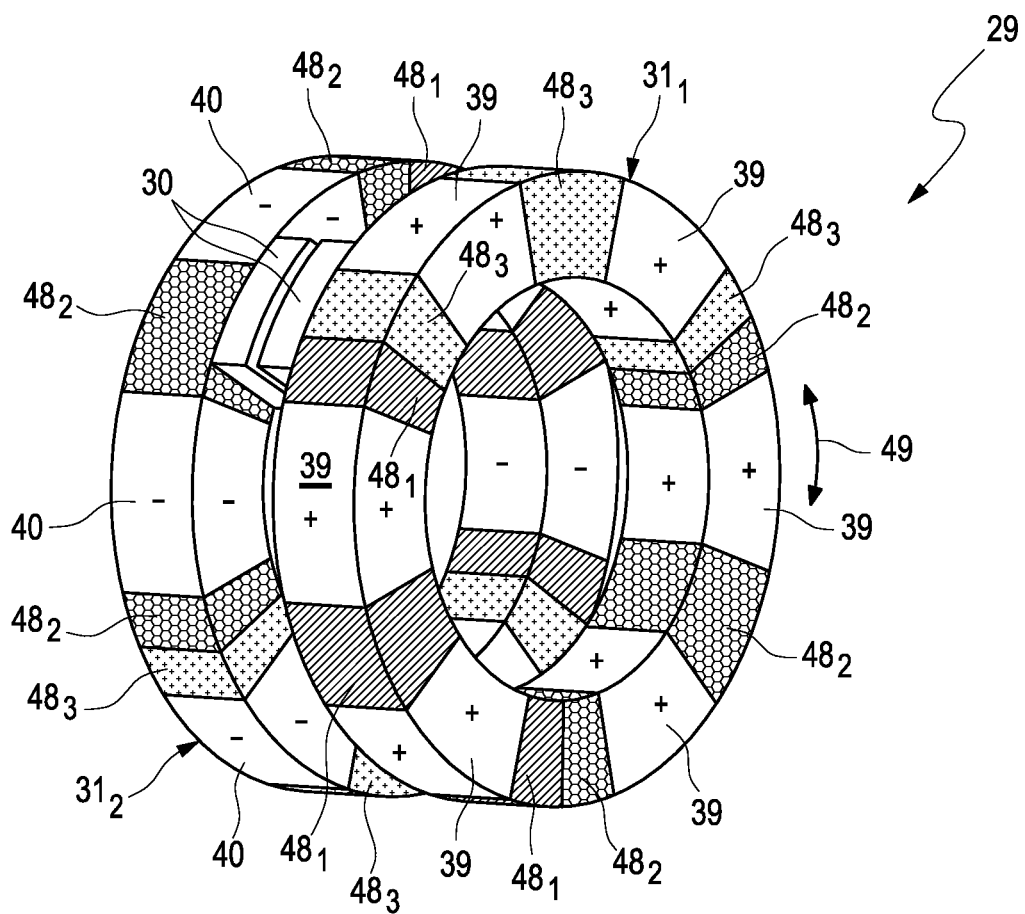
FIG. 19 shows an isometric view of a further slip ring arrangement in the case of axial commutation.
Figure 20:
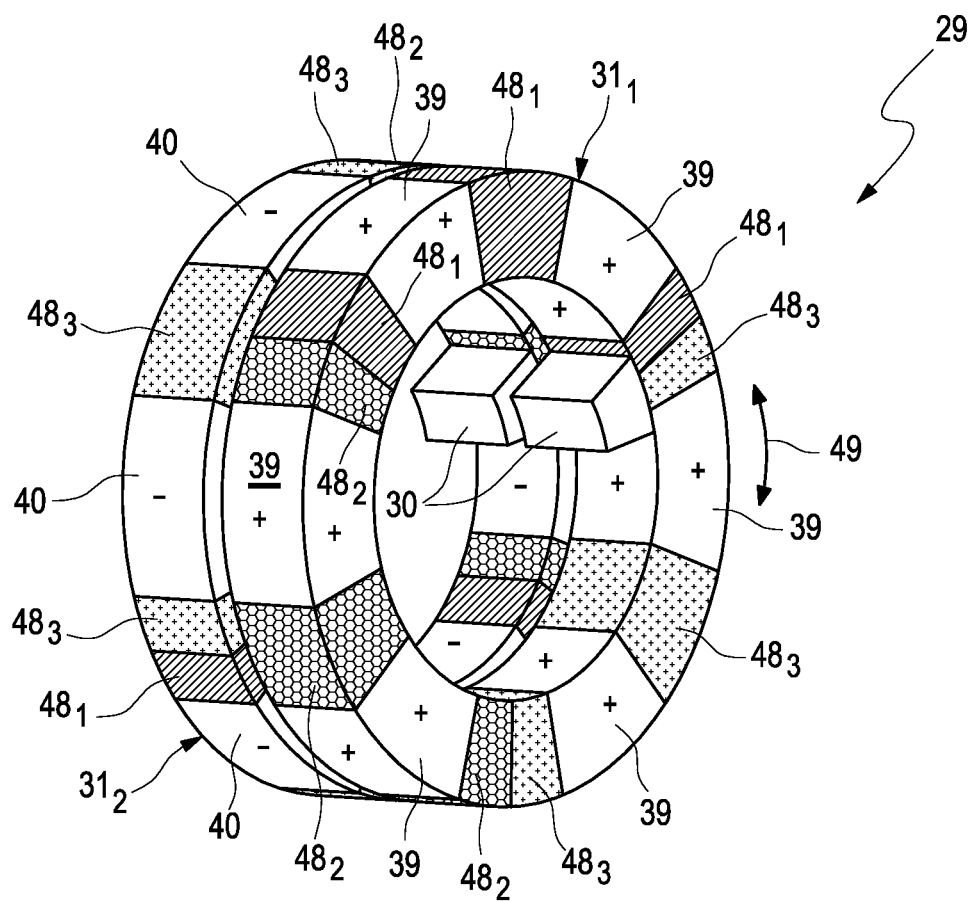
FIG. 20 shows an isometric view of the further slip ring arrangement from FIG. 19, but in the case of radial commutation.

According to a different embodiment, it can be provided in particular according to FIGS. 19 and 20 that in the first slip ring $31_1$, a plurality of coil segments 48, which follow one another in the circumferential direction 49 and are only separated from one another by plus-pole segments 39, are assigned to each coil strand 38, a plurality of coil segments 48, which follow one another in the circumferential direction 49 and are only separated from one another by minus-pole segments 40, being assigned to each coil strand 38 in the second slip ring $31_2$.

According to a preferred development, it can be provided in particular according to FIGS. 19 and 20 that at least one of the coil segments 48, which is assigned to one of the coil strands 38, adjoins a different coil segment 48 in the circumferential direction 49, which is assigned to a different coil strand 38. The mutually adjoining coil segments 48 are in this case expediently electrically insulated with respect to one another.

Particularly advantageous is a development according to FIGS. 19 and 20, in which coil segments 48, which adjoin plus-pole segments 39 on both sides in the circumferential direction 49, are the same size in the circumferential direction 49 as the plus-pole segments 39, whilst coil segments 48, which adjoin a different coil segment 48 in the circumferential direction 49, are half as large as the plus-pole segments 39, coil segments 48, which adjoin minus-pole segments 40 on both sides in the circumferential direction 49, being the same size as the minus-pole segments 40 in the circumferential direction 49, whilst coil segments 48, which adjoin a different coil segment 48 in the circumferential direction 49, are half as large as the minus-pole segments 40.

Advantageously, the two slip rings $31_1$, $31_2$ can be arranged relatively to one another such that the coil segments 48 of the first slip ring $31_1$ are arranged offset in the circumferential direction 49 with respect to the coil segments 48 of the second slip ring $31_2$ with regards to the coil strands 38 assigned to them.

The coil segments 48, which are assigned to the same coil strand 38 in each case, are identically hatched or graphically identically configured. The coil segments 48, which are assigned to various coil strands 38, are also differently hatched or graphically differently configured.

Furthermore, it can be provided according to FIGS. 13, 17 and 19 that the contact elements 30, which are in contact with the respective slip ring $31_1$, $31_2$, are arranged axially between the two slip rings $31_1$, $31_2$, as a result of which the contact commutation has a very small construction in the radial direction.

According to an advantageous development, it can be provided in this case that a first contact element 30 contacted with the first slip ring $31_1$ is axially adjacent to a second contact element 30 contacted with the second slip ring $31_2$ and is arranged electrically insulated therefrom.

Figure 21:
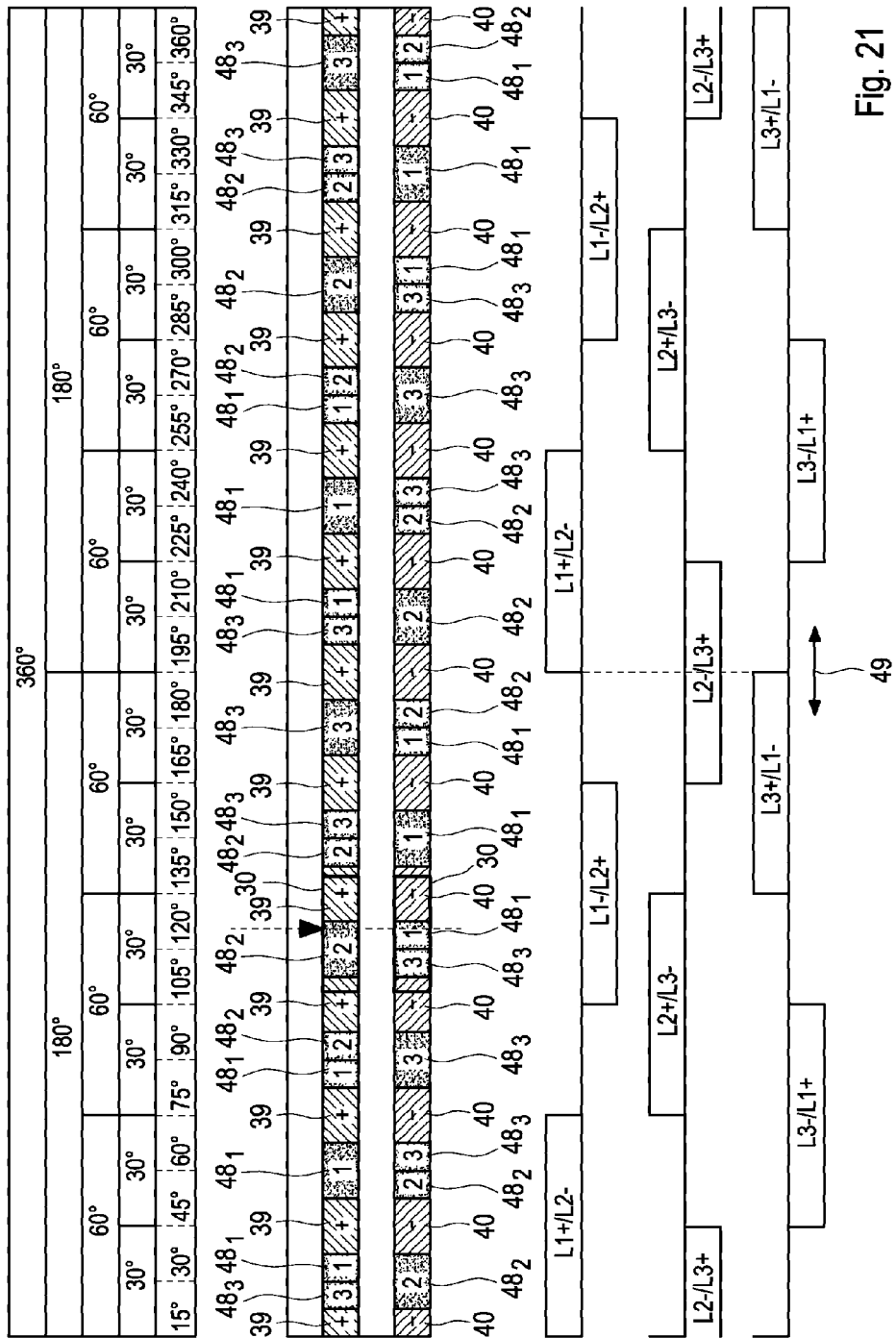
FIG. 21 shows a commutation schematic for the embodiments of FIGS. 19 and 20, FIGS. 22-24 show commutation schematics of further embodiments of slip ring arrangements of this type.
Figure 22:
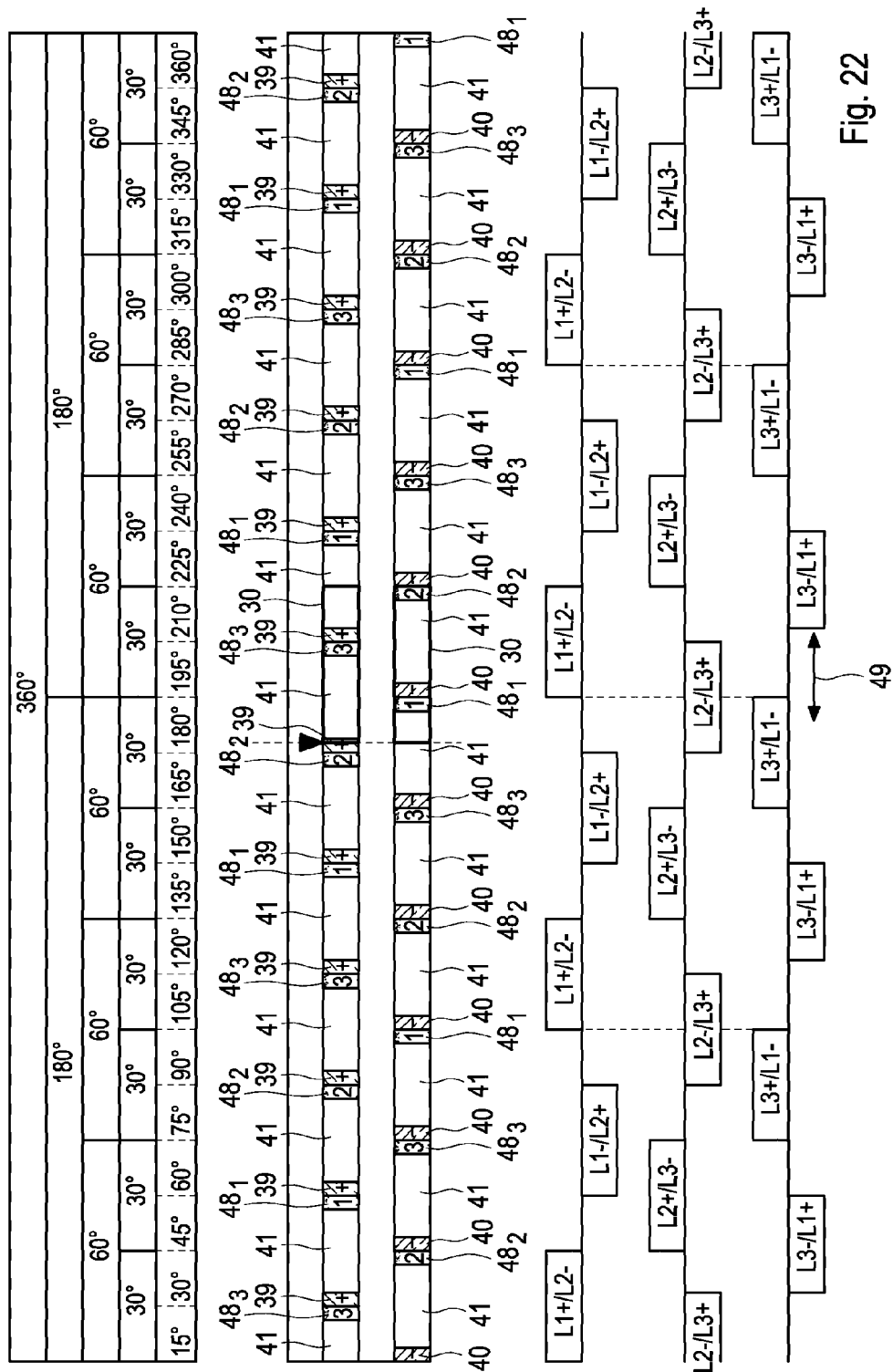
Figure 23:
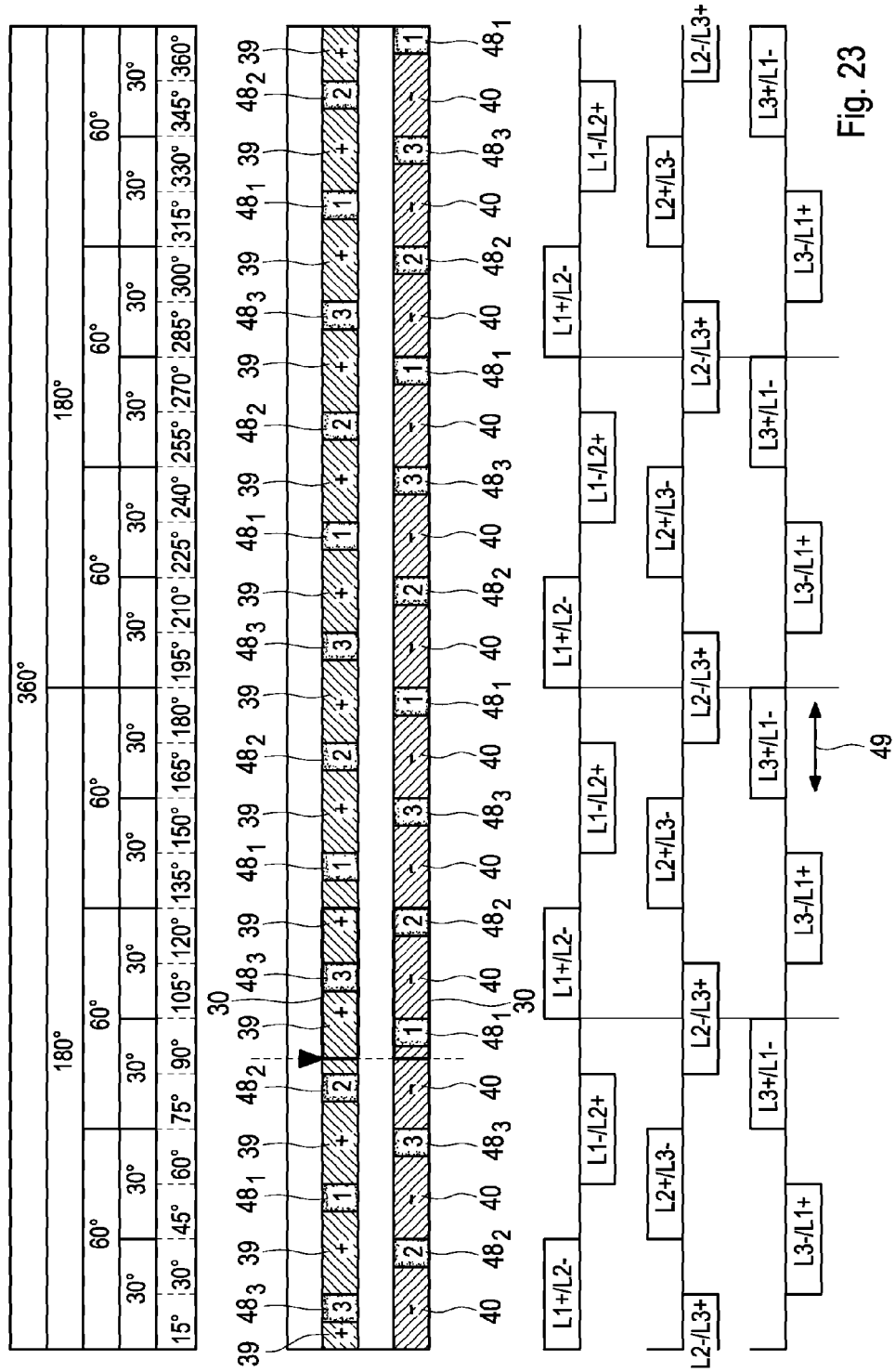
Figure 24:
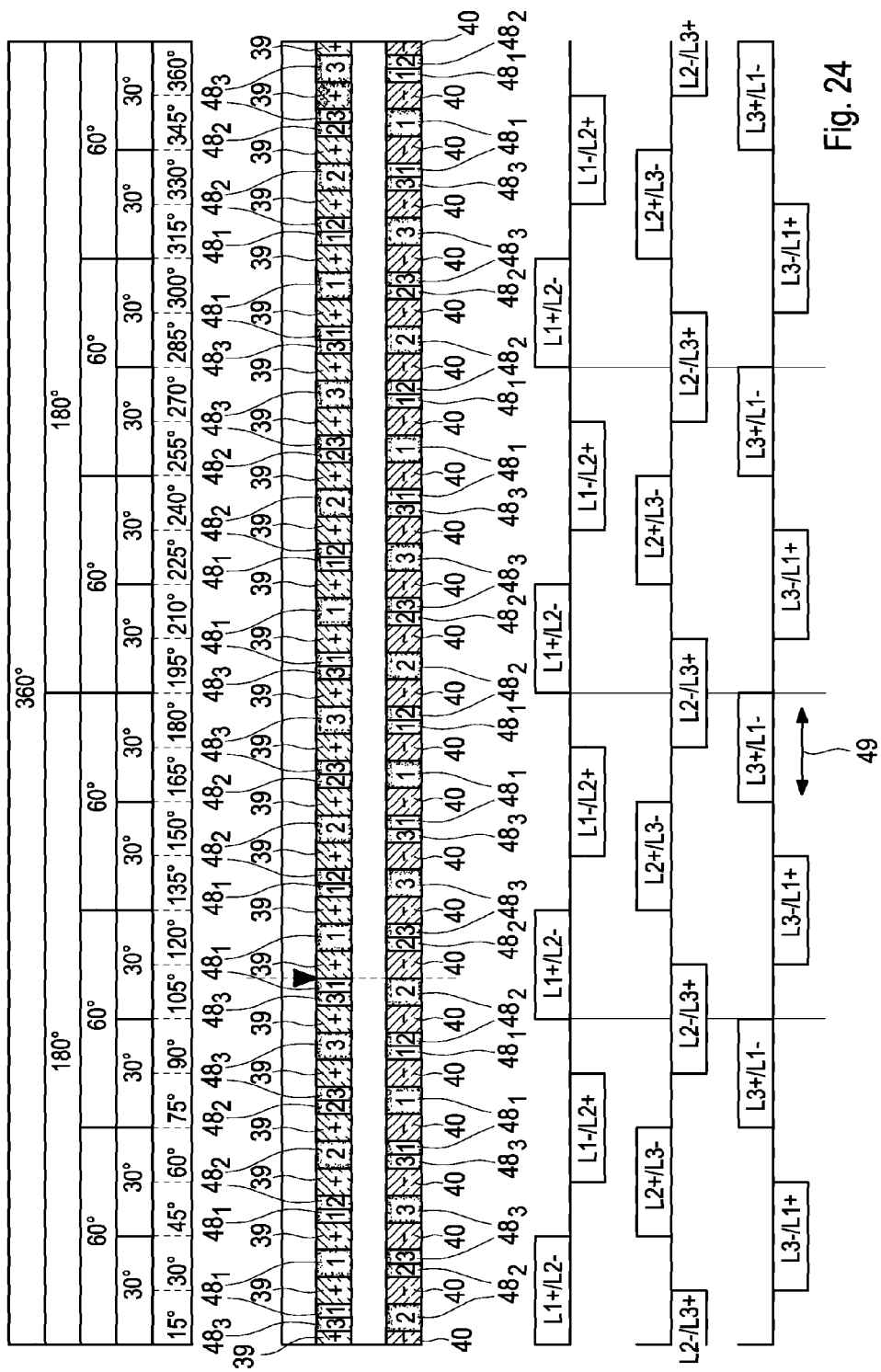

FIG. 15 shows the unrolled schematic of the commutation for the slip ring arrangement 29 of FIGS. 13 and 14. FIG. 16 shows the unrolled schematic of the commutation for the slip ring arrangement 29 of FIGS. 17 and 18. FIG. 21 shows the unrolled schematic of the commutation for the slip ring arrangement 29 of FIGS. 19 and 20. FIGS. 22 to 24 show further unrolled schematics of the commutation for modified slip ring arrangements 29, which differ from one another by a different number or distribution of the various segments.

In principle, the adjacent segments 39, 40, 41, 48 in the respective slip ring 31 can adjoin one another arbitrarily in the circumferential direction 49. Preferred are embodiments according to FIGS. 5, 7 to 24 and 25a, in which at least two of the adjacent segments 39, 40, 41, 48 in the circumferential direction 49 adjoin one another in a plane 50 which contains the rotational axis 51 of the rotor 19. As a result, the segments 39, 40, 41, 48 can be of relatively short construction in the circumferential direction 49.

Figure 25:
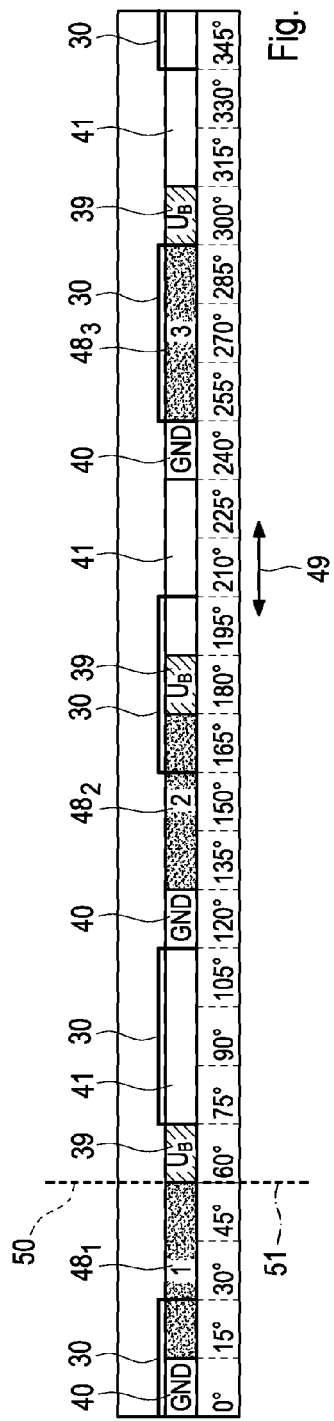
FIG. 25 shows a comparison of unrolled schematics of a segmented slip ring in the case of different segment transitions (a, b, c).
Figure 25:
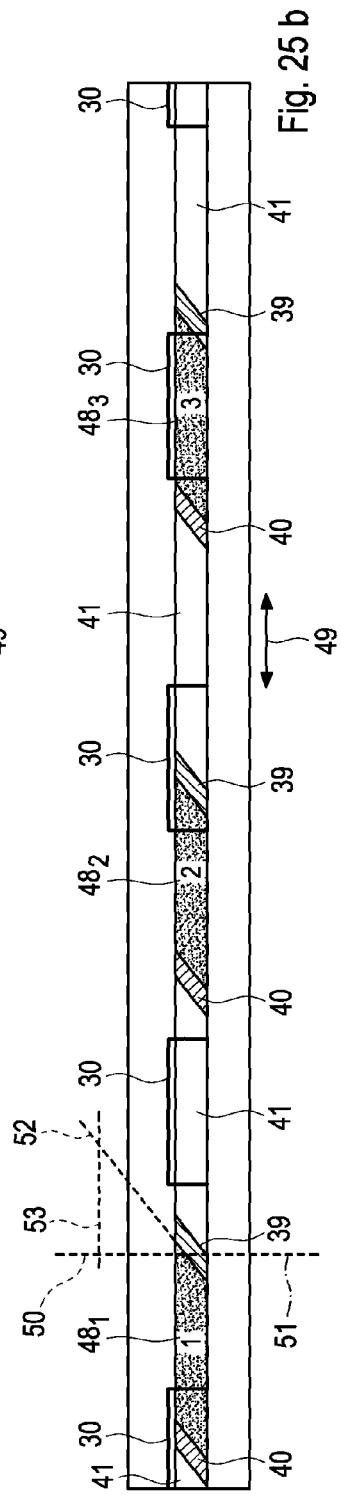
Figure 25:
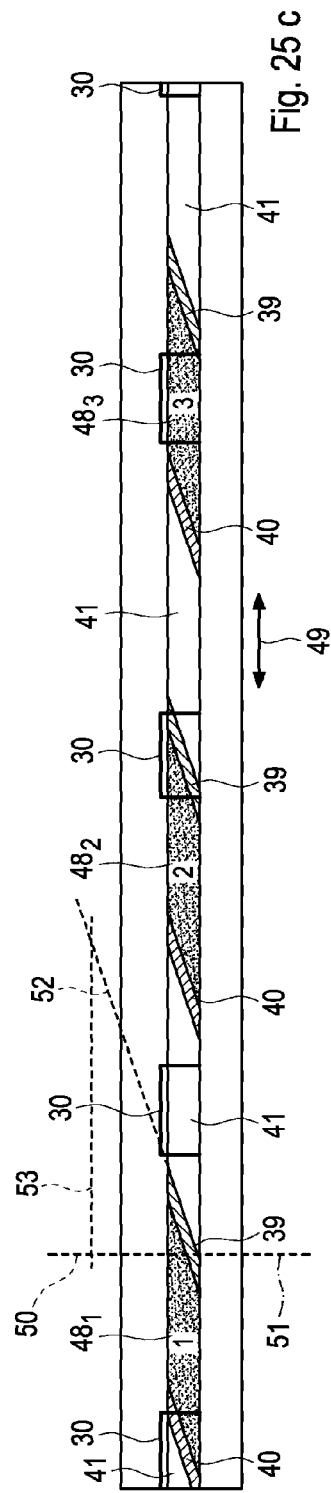

In FIG. 25, for an embodiment, in which the slip ring arrangement 29 comprises only one single slip ring 31 as in the examples of FIGS. 8 to 12, in addition to the previously mentioned, preferred variant, two further variants are illustrated below one another in three part figures a, b, c, specifically in the form of the respectively associated unrolled schematic of the commutation. The plane 50, in which the adjacent segments 39, 40, 41, 48 adjoin one another in the variant shown in FIG. 25a, contains—as explained—the rotational axis 51. According to the alternatives of FIGS. 25b and 25c, it may expedient in the case of the indicated radial commutation, that at least two adjacent segments 39, 40, 41, 48 in the circumferential direction 49 adjoin one another in a plane 52, which is inclined with respect to a plane 53 running perpendicularly to the rotational axis 51 of the rotor 19 and intersects the rotational axis 51 of the rotor 19. In the case of axial commutation, it can be provided by contrast, that at least two adjacent segments 39, 40, 41, 48 in the circumferential direction 49 adjoin one another in a plane, which is inclined with respect to the plane 50 containing the rotational axis 51 of the rotor 19 and runs parallel to the rotational axis 51 of the rotor 19.

The invention claimed is:

1. An electric motor with contact commutation, comprising:
   an external stator and an internal, rotatably mounted rotor;
   a magnet arrangement including at least one permanent magnet arranged fixedly on the rotor;
   a coil arrangement including at least one electric coil arranged fixedly on the stator;
   a contact commutation assembly in communication with the coil arrangement, the contact commutation assembly including a contact element arrangement that is driven rotatably by the rotor and includes at least one contact element, and a slip ring arrangement that is arranged rotationally fixed relative to the stator and electrically connected to the coil arrangement;

wherein the slip ring arrangement includes a plurality of slip rings, and at least two slip rings of the plurality of slip rings define a slip ring group and are electrically connected to one another via the at least one contact element; and wherein the slip ring group has two slip rings that define a slip ring pair;

the slip ring pair includes a first slip ring and a second slip ring;

the first slip ring being electrically connected to at least one of the coil arrangement and a coil strand associated with the coil arrangement;

the second slip ring being segmented in a circumferential direction and including (i) at least one plus-pole segment, the at least one plus-pole segment electrically connected to a plus-pole terminal, the plus-pole terminal being connected to a plus pole of a power supply; (ii) at least one minus pole segment electrically connected to a minus-pole terminal, the minus-pole terminal connected to a minus pole of the power supply; and (iii) at least two insulator segments, the at least two insulator segments being arranged in each case between the at least one plus-pole segment and the at least one minus-pole segment in the circumferential direction.

2. The electric motor according to claim 1, wherein:
a magnetic north pole and a magnetic south pole respectively define a magnetic pole pair within the magnet arrangement, and
the number of plus-pole segments and the number of minus-pole segments is equal to the tuber of magnetic pole pairs.

3. The electric motor according to claim 1, wherein the coil arrangement includes a plurality of coil strands each provided by a winding defining a single coil or a plurality of coils connected in series;
the first slip ring is segmented in a circumferential direction defining a plurality of plus-pole segments, the plurality of plus-pole segments electrically connected to a plus-pole terminal, the plus-pole terminal connected to a plus pole of a power supply, and each of the plurality of coil strands has at least one coil segment, which is electrically connected to the respective coil strand, wherein the plurality of plus-pole segments and the plurality of coil segments are electrically insulated with respect to one another in the circumferential direction; and
wherein the at least one minus-pole segment of the second slip ring includes a plurality of minus-pole segments electrically connected to a minus-pole terminal that is connected to a minus pole of the power supply, and each of the plurality of coil strands has at least one coil segment, which is electrically connected to the respective coil strand, wherein the plurality of minus-pole segments and the plurality of coil segments are electrically insulated with respect to one another in the circumferential direction.

4. The electric motor according to claim 3, wherein:
the plurality of plus-pole segments and the plurality of coil segments of the first slip ring follow one another in the circumferential direction such that at least one coil segment is arranged between two plus-pole segments, and
the plurality of minus-pole segments and the plurality of coil segments of the second slip ring follow one another in the circumferential direction such that at least one coil segment is arranged between two minus-pole segments.

5. The electric motor according to claim 3, wherein:
the first slip ring further includes an electrically insulating insulator segment for each coil segment, wherein the plurality of plus-pole segments, the plurality of insulator segments and the plurality of coil segments following one another in the circumferential direction such that each coil segment adjoins one of the plurality insulator segments on one side and one of the plurality of plus-pole segments on the other side, and
the second slip ring further includes an electrically insulating insulator segment for each coil segment, wherein the plurality of minus-pole segments, the plurality of insulator segments and the plurality of coil segments following one another in the circumferential direction such that each coil segment adjoins one of the plurality of insulator segments on one side and one of the plurality of minus-pole segments on the other side.

6. The electric motor according to claim 5, wherein at least one of:
the plurality of respective insulator segments in the circumferential direction are larger than at least one of the plurality of respective plus-pole segments, the plurality of respective minus-pole segments and the plurality of respective coil segments, and
the plurality of respective coil segments in the circumferential direction have a size the same as at least one of the plurality respective plus-pole segments and the plurality of respective minus-pole segments.

7. The electric motor according to claim 3, wherein in the first slip ring, each of the plurality of coil segments in the circumferential direction adjoins one of the plurality of plus-pole segments on both sides thereof, and in the second slip ring, each of the plurality of coil segments adjoins one of the plurality of minus-pole segments on both sides in the circumferential direction.

8. The electric motor according to claim 7, wherein the plurality of respective coil segments in the circumferential direction are smaller than at least one of the plurality of respective plus-pole segments and the plurality of respective minus-pole segments.

9. The electric motor according to claim 8, wherein the at least two slip rings are integrated into at, least one of an axial end face of the stator and a housing containing the stator in a rotationally fixed manner.

10. The electric motor according to claim 3, wherein:
the plurality of coil segments in the first slip ring follow one another in the circumferential direction and are separated from one another by at least one of the plurality of plus-pole segments, wherein the plurality of coil segments in the first slip ring are respectively associated with one of the plurality of coil strands, and
the plurality of coil segments in the second slip ring follow one another in the circumferential direction and are separated from one another by at least one of the plurality of minus-pole segments, wherein the plurality of coil segments of the second slip ring are respectively associated with one of the plurality of coil strands.

11. The electric motor according to claim 10, wherein at least one of the plurality of coil segments in at least one of the first slip ring and the second slip ring, the at least one coil segment being associated with one of the plurality of coil strands, adjoins another coil segment in the circumferential direction associated with a different coil strand of the plurality of coil strands.

12. The electric motor according to claim 11, wherein:
the plurality of coil segments of the first slip ring which adjoin the at least one plus-pole segment on both sides in the circumferential direction are the same size in the circumferential direction as the at least one plus-pole segment, wherein the at least one coil segments adjoining the other coil segment in the circumferential direction is half as large as the at least one plus-pole segment, and wherein the plurality of coil segments of the second slip ring which adjoin the at least one minus-pole segment on both sides in the circumferential direction are the same size in the circumferential direction as the at least one minus-pole segment, wherein the at least one coil segments adjoining the other coil segment in the circumferential direction is half as large as the at least one minus-pole segment.

13. The electric motor according to claim 3, wherein the first slip ring and the second slip ring are arranged with respect to one another such that the plurality of coil segments of the first slip ring are arranged offset in the circumferential direction with respect to the plurality of coil segments of the second slip ring with regard to the plurality of associated coil strands.

14. The electric motor according to claim 3, wherein the at least one contact element in contact with the at least two slip rings is arranged axially between the at least two slip rings.

15. The electric motor according to claim 14, wherein the rotor includes at least two contact elements, a first contact element in contact with the first slip ring and a second contact element in contact with the second slip ring, wherein the first contact element is arranged axially adjacent to the second contact element, and the second contact element is arranged electrically insulated from the second slip ring.

16. The electric motor according to claim 1, wherein the coil arrangement is arranged axially offset to the slip ring arrangement at least one of on and in a housing containing the stator.

17. The electric motor according to claim 1, further comprising:
a winding defining a coil strand including at least one of a single coil and a plurality of coils connected in series, and
a separate slip ring group associated with each coil strand, wherein each coil strand is electrically connected to the associated separate slip ring group.

18. The electric motor according to claim 1, wherein the contact element arrangement is fixedly arranged on the rotor.

19. The electric motor according to claim 1, wherein the contact element arrangement is arranged fixedly on a contact element shaft, the contact element shaft being drive-connected via a gearbox to the rotor.

20. The electric motor according to claim 1, wherein the at least one contact element radially contacts at least one slip ring.

21. The electric motor according to claim 1, wherein the at least one contact element axially contacts at least one slip ring.

22. The electric motor according to claim 1, wherein the at least one contact element is arranged on at least one of the rotor and a contact element shaft via a contact element support, the contact element support including a spring arranged therein, wherein the at least one contact element is pretensioned against the at least one slip ring at least one of radially and axially via the spring.

23. The electric motor according to claim 1, wherein the at least one slip ring is segmented in a circumferential direction defining (i) one of at least one plus-pole segment and at least one minus-pole segment, and (ii) at least one insulator segment adjacent to the one of the at least one plus-pole segment and the at least one minus-pole segment, wherein the at least one insulator segment and the one of the at least one plus-pole segment and the at least one minus-pole segment in the circumferential direction adjoin one another in a plane, wherein the plane contains the rotational axis of the rotor, or the plane is inclined with respect to a plane containing the rotational axis of the rotor and runs parallel to the rotational axis of the rotor, or the plane is inclined with respect to a plane running perpendicularly to the rotational axis of the rotor and intersects the rotational axis of the rotor.

24. An electric motor with contact commutation, comprising:
an external stator and an internal, rotatably mounted rotor;
a magnet arrangement including at least one permanent magnet arranged fixedly on the rotor;
a coil arrangement including at least one electric coil arranged fixedly on the stator;
a contact commutation assembly in communication with the coil arrangement, the contact commutation assembly including a contact element arrangement and a slip ring arrangement;
the contact element arrangement driven rotatably by the rotor and including at least one contact element;
the slip ring arrangement arranged rotationally fixed relative to the stator and electrically connected to the coil arrangement, wherein the slip ring arrangement includes at least one slip ring; and
wherein the contact element arrangement is arranged fixedly on a contact element shaft, the contact element shaft being drive-connected via a gearbox to the rotor.

25. The electric motor according to claim 24, wherein the slip ring arrangement includes a plurality of slip rings, and at least two slip rings of the plurality of slip rings define a slip ring group, wherein the slip ring group includes at least two slip rings electrically connected to one another via the at least one contact element.

26. The electric motor according to claim 25, wherein the slip ring group includes three slip rings comprising:
a first slip ring electrically connected to a plus-pole terminal, the plus-pole terminal connected to a plus pole of a power supply;
a second slip ring electrically connected to a minus-pole terminal, the minus-pole terminal connected to a minus pole of the power supply;
a third slip ring segmented in a circumferential direction and including a plurality of insulator segments and a plurality of coil segments, wherein the plurality of insulator segments and the plurality of coil segments are electrically connected to the coil arrangement and alternate in the circumferential direction; and
wherein at least one contact element electrically connects the first slip ring to the third slip ring, and at least one other contact element electrically connects the second slip ring to the third slip ring.

27. The electric motor according to claim 26, wherein the slip ring arrangement has one slip ring group with three slip rings, wherein the plurality of coil segments are associated with different coils or coil strands.

28. An electric motor with contact commutation, comprising:
an external stator and an internal, rotatably mounted rotor;
a magnet arrangement including at least one permanent magnet arranged fixedly on the rotor;
a coil arrangement including at least one electric coil arranged fixedly on the stator;

a contact commutation assembly in communication with the coil arrangement, the contact commutation assembly including a contact element arrangement and a slip ring arrangement;

the contact element arrangement driven rotatably by the rotor and including at least one contact element;

the slip ring arrangement arranged rotationally fixed relative to the stator and electrically connected to the coil arrangement;

wherein the slip ring arrangement has a single slip ring segmented in a circumferential direction, the single slip ring including:

at least one plus-pole segment electrically connected to a plus-pole terminal, the plus-pole terminal connected to a plus pole of a power supply;

at least one minus-pole segment electrically connected to a minus-pole terminal, the minus-pole terminal connected to a minus pole of the power supply;

at least one coil segment electrically connected to the coil arrangement; and at least one electrically insulating insulator segment;

wherein the at least one plus-pole segment, the at least one minus-pole segment, the at least one coil segment and the at least one insulator segment follow one another in the circumferential direction such that the at least one coil segment is arranged between the at least one plus-pole segment and the at least one minus-pole segment, and the at least one insulator segment is arranged between the at least one plus-pole segment and the at least one minus-pole segment.

29. The electric motor according to claim 28, wherein the coil arrangement includes a coil strand provided by a winding defining single coil or a plurality of coils connected in series.

30. The electric motor according to claim 29, wherein the coil arrangement includes a plurality of coil strands and the slip ring includes a plurality of coil segments, wherein each coil segment is electrically connected to one of the plurality of coil strands, and each coil strand is electrically connected to at least one of the plurality of coil segments.

* * * * *